United States Patent
Hayashi

(10) Patent No.: US 8,059,296 B2
(45) Date of Patent: Nov. 15, 2011

(54) IMAGE FORMING APPARATUS THAT SYNTHESIZES FIBER INFORMATION EXTRACTED FROM PAGES OF A PAPER MEDIUM HAVING A PLURALITY OF PAGES, AND AN IMAGE FORMING APPARATUS CONTROL METHOD, A PROGRAM, AND A STORAGE MEDIUM RELATING THERETO

(75) Inventor: Tomonori Hayashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 469 days.

(21) Appl. No.: 12/249,582

(22) Filed: Oct. 10, 2008

(65) Prior Publication Data
US 2009/0103130 A1    Apr. 23, 2009

(30) Foreign Application Priority Data
Oct. 23, 2007   (JP) ................. 2007-275476

(51) Int. Cl.
G06K 15/00    (2006.01)
G06K 9/00     (2006.01)

(52) U.S. Cl. ....... 358/1.15; 358/1.9; 358/1.14; 382/135; 382/137

(58) Field of Classification Search .................. None
See application file for complete search history.

(56) References Cited

U.S. PATENT DOCUMENTS

| | | | |
|---|---|---|---|
| 5,471,281 A | 11/1995 | Hayashi et al. | |
| 5,481,334 A | 1/1996 | Arimoto et al. | |
| 5,617,187 A | 4/1997 | Hayashi et al. | |
| 5,631,723 A | 5/1997 | Arimoto et al. | |
| 5,650,863 A | 7/1997 | Utagawa et al. | |
| 5,763,891 A | 6/1998 | Yoshinaga et al. | |
| 6,051,826 A | 4/2000 | Arimoto et al. | |
| 6,078,682 A | 6/2000 | Tanioka et al. | |
| 6,580,820 B1* | 6/2003 | Fan | 382/135 |
| 2008/0055671 A1* | 3/2008 | Tabata | 358/474 |
| 2008/0088873 A1* | 4/2008 | Chihara | 358/1.15 |
| 2008/0130025 A1 | 6/2008 | Yamamizu | 358/1.9 |
| 2008/0130029 A1 | 6/2008 | Hayashi | 358/1.9 |
| 2008/0137153 A1* | 6/2008 | Kunori et al. | 358/462 |
| 2008/0148137 A1* | 6/2008 | Terao et al. | 715/200 |

* cited by examiner

*Primary Examiner* — King Poon
*Assistant Examiner* — Christopher D Wait
(74) *Attorney, Agent, or Firm* — Fitzpatrick, Cella, Harper & Scinto

(57) ABSTRACT

An object of the present invention is to provide an image forming apparatus which can guarantee the originality of a document consisting of a plurality of pages. To achieve the object, an image forming apparatus of the present invention includes an extracting unit that extracts fiber information from paper media; a first storage unit that synthesizes and storing fiber information extracted from pages of a first paper medium consisting of a plurality of pages by using the extracting unit as first fiber information; a second storage unit that synthesizes and stores fiber information extracted from pages of a second paper medium consisting of a plurality of pages by using the extracting unit as second fiber information; and a comparing unit that compares the first fiber information and the second fiber information and determining whether these match each other.

8 Claims, 21 Drawing Sheets

IMAGE FORMING APPARATUS THAT SYNTHESIZES FIBER INFORMATION EXTRACTED FROM PAGES OF A PAPER MEDIUM HAVING A PLURALITY OF PAGES, AND AN IMAGE FORMING APPARATUS CONTROL METHOD, A PROGRAM, AND A STORAGE MEDIUM RELATING THERETO

BACKGROUND OF THE INVENTION

1. Field of the Invention

The present invention relates to an image forming apparatus and image forming apparatus control method, program, and storage medium which can handle paper fingerprint information.

2. Description of the Related Art

Paper is made of plant fibers with a thickness of 20 to 30 microns. By entwining these, a random pattern is created. This random pattern is different paper by paper as in the case of fingerprints, and such a random pattern of paper is called paper fingerprint information.

The paper fingerprint information is different paper by paper, so that when "the original that I published is made of paper having this paper fingerprint information" is registered, it can be determined whether the paper is "original" or "fake" later. As a matter of course, "fake" includes "copy of the original."

However, by using the technique of paper fingerprints, when paper fingerprints of pages of a paper document consisting of a plurality of pages are registered in advance and an attempt is made to prove the originality by comparing these with paper fingerprint information extracted from a paper document as a collating object, the following problem occurs. That is, this paper document is easily falsified and this falsification cannot be detected.

For example, when a page in this paper document was thrown away by a third party, it cannot be proved that the page was thrown away. When a third party added a new page created by the third party to the paper document which consists of a plurality of pages or replaced one page of the paper document with the new page, this addition or replacement cannot be proved.

In other words, in this technique of paper fingerprint information, although the originalities of pages can be proved, the originality as a whole of the paper document consisting of a plurality of pages cannot be proved.

SUMMARY OF THE INVENTION

The present invention was made in view of the above-described problem. An object thereof is to guarantee the originality as a whole of a paper document consisting of a plurality of pages.

Herein, "falsification" means an act such as replacement and stealing, etc. "Originality" means "authenticity."

To solve the above-described problem, an image forming apparatus of the present invention includes an extracting unit that extracts fiber information from paper media; a first storage unit that synthesizes and stores fiber information extracted from pages of a first paper medium consisting of a plurality of pages by using the extracting unit as first fiber information; a second storage unit that synthesizes and stores fiber information extracted from pages of a second paper medium consisting of a plurality of pages using the extracting unit as second fiber information; and a comparing unit that compares the first fiber information and second fiber information and determines whether they match each other.

By the present invention, the originality as a whole of a paper document consisting of a plurality of pages can be proved.

Further features of the present invention will become apparent from the following description of exemplary embodiments (with reference to the attached drawings).

DESCRIPTION OF THE EMBODIMENTS

Hereinafter, a best mode for carrying out the present invention will be described with reference to the drawings.

First Embodiment

<Printing System (FIG. 1)>

Figure 1:
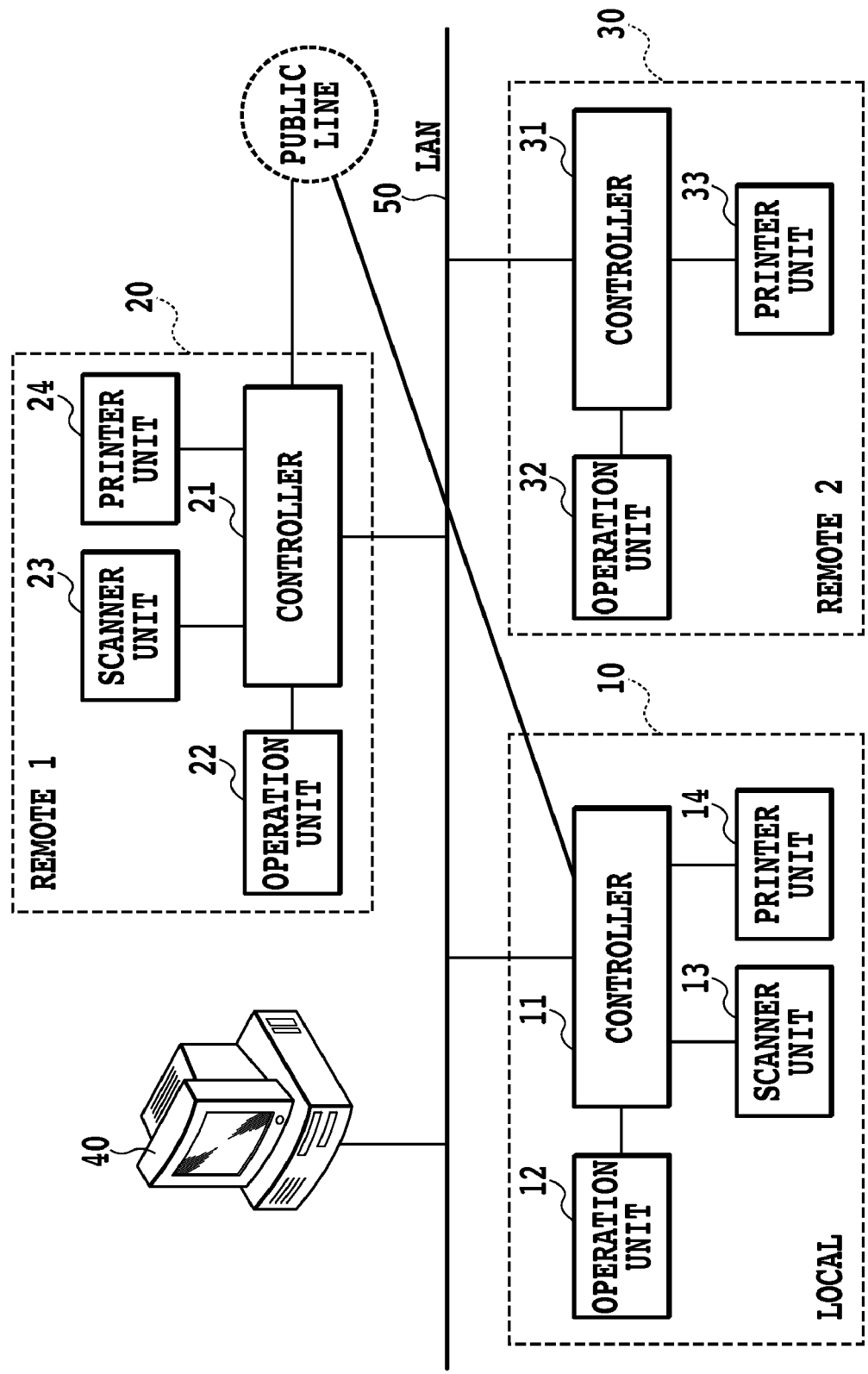
FIG. 1 is a view showing the entirety of a printing system of an embodiment of the present invention.

A first embodiment will be described in detail with reference to the drawings. FIG. 1 is a block diagram showing a printing system of an embodiment of the present invention. In this system, a host computer 40 and three image forming apparatuses (10, 20, and 30) are connected to a LAN 50, however, in the printing system of the present invention, the number of connections is not limited to this. In the present embodiment, a LAN is applied as a connection method, however, the connection method is not limited to this. For example, an arbitrary network such as a WAN (public line), a serial transmission method such as a USB, and a parallel transmission method such as Centronics or SCSI are also applicable.

A host computer (hereinafter, referred to as PC) 40 has functions of a personal computer. This PC 40 can send and receive files and electronic mail by using FTP and SMB protocols via the LAN 50 or WAN. In addition, the PC 40 can issue a printing command to the image forming apparatuses 10, 20, and 30 via a printer driver.

The image forming apparatus 10 and the image forming apparatus 20 are apparatuses having the same components. The image forming apparatus 30 is an image forming apparatus having only a printing function, and does not have a scanner unit that the image forming apparatus 10 and the image forming apparatus 20 have. Hereinafter, for convenience of description, between the image forming apparatuses 10 and 20, detailed description is given focusing on the image forming apparatus 10.

The image forming apparatus 10 includes a scanner unit 13 as an image input device, a printer unit 14 as an image output device, a controller 11 governing operation controls of the entire image forming apparatus 10, and an operation unit 12 as a user interface (UI).

The image forming apparatus 20 includes a scanner unit 23 as an image input device, a printer unit 24 as an image output device, a controller 21, and an operation unit 22 as a user interface (UI). Herein, the controller 21 governs operation controls of the entire image forming apparatus 20.

The image forming apparatus 30 includes a printer unit 33 as an image output device, a controller 31 governing operation controls of the entire image forming apparatus 30, and an operation unit 32 as a user interface (UI).

<Image Forming Apparatus 10 (FIG. 2)>

Figure 2:
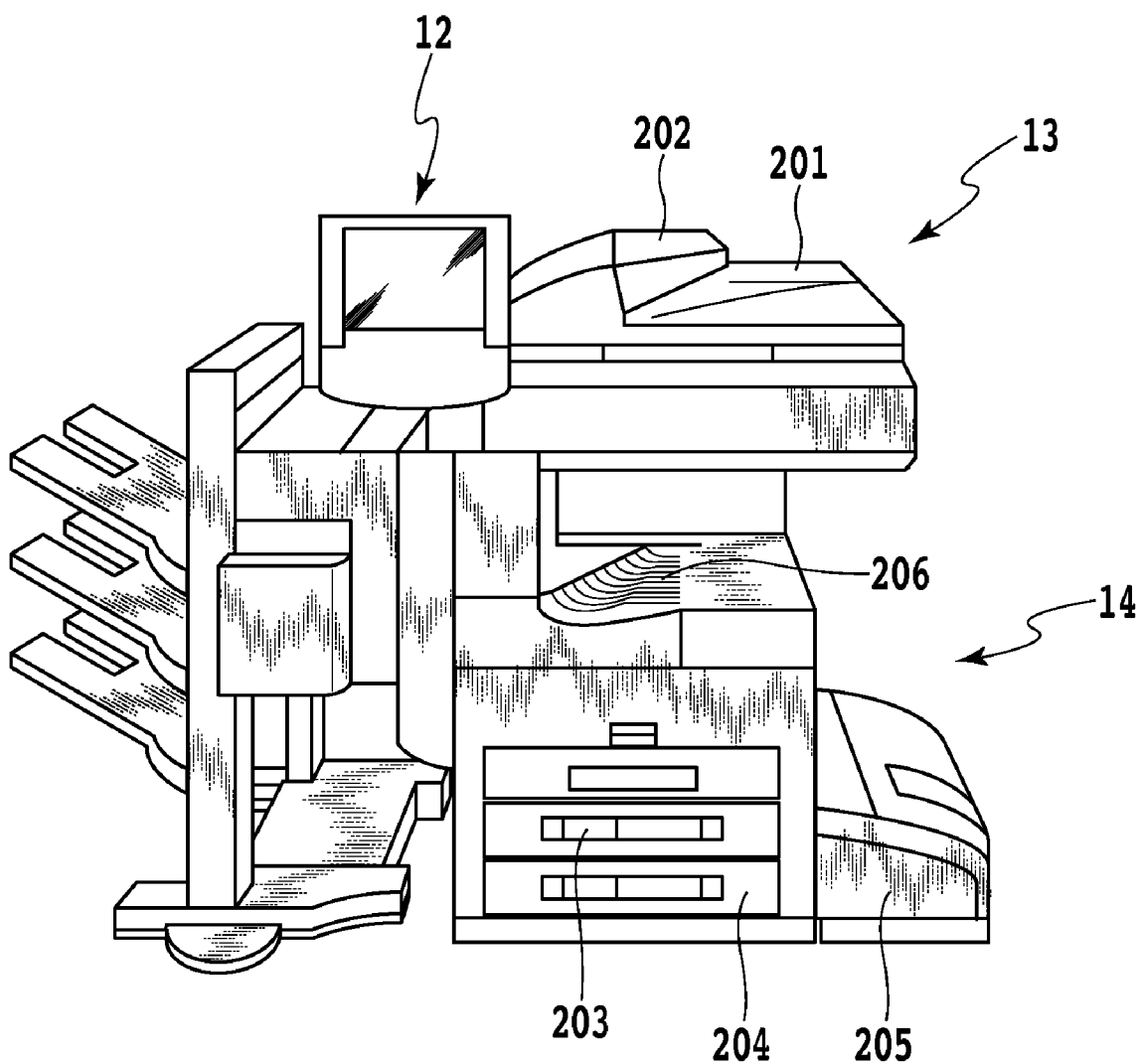
FIG. 2 is an external view of an image forming apparatus of an embodiment of the present invention.

An external view of the image forming apparatus is shown in FIG. 2. The scanner unit 13 includes a plurality of CCDs. If the sensitivities of the CCDs are different from each other, even if the densities of pixels on a document are the same, the pixels are recognized as having different densities. Therefore, the scanner unit exposure-scans a white plate (evenly white plate) first, and converts an amount of reflected light obtained through the exposure scanning into an electric signal and outputs it to the controller 11.

As described later, a shading correction unit 500 shown in FIG. 5 inside the controller 11 recognizes sensitivity differences among the CCDs based on electric signals obtained from the respective CCDs. Then, by using the recognized sensitivity differences, electric signal values obtained by scanning an image on the document are corrected. Further, when the shading correction unit 500 receives gain adjustment information from a CPU 301 described later inside the controller 11, the shading correction unit performs gain adjustment corresponding to the information. Gain adjustment is used for adjusting the way of allocating the electric signal values obtained by exposure-scanning the document to 0 to 255 luminance signal values. By this gain adjustment, the values of the electric signals obtained by exposure-scanning the document can be converted into higher-luminance signal values or lower-luminance signal values.

Subsequently, a method for scanning the image on the document by the image forming apparatus will be described below.

The scanner unit 13 converts information of the image into electric signals by inputting reflected light obtained by exposure-scanning the image on the document into the CCDs. Further, the scanner converts the electric signals into luminance signals of R, G, and B colors, and outputs these luminance signals as image data to the controller 11.

The document is set in a tray 202 of a document feeder 201. When a user instructs a reading out start from the operation unit 12, a document reading out instruction is issued to the scanner unit 13 from the controller 11. The scanner unit 13 receives this instruction and performs a document reading out operation by feeding the document sheet by sheet from the tray 202 of the document feeder 201. The document reading out method may be a method in which the document is placed on a glass surface not shown and scanned by moving an exposure unit, instead of an automatic feeding method by the document feeder 201.

The printer unit 14 is an image forming device which forms image data received from the controller 11 on a sheet. As the image forming method, in the present embodiment, an electrophotographic method using a photosensitive drum and a photosensitive belt is used, however, the present invention is not limited to this. For example, the present invention is also applicable to an ink-jet method in which ink is discharged from a micro nozzle array to perform printing on sheets. The printer unit 14 is provided with a plurality of sheet cassette 203, 204, and 205 which enables selection of different sheet sizes or sheet orientations. Into a sheet receiving tray 206, sheets after being printed are discharged.

<Detailed Description of Controller 11 (FIG. 3)>

Figure 3:
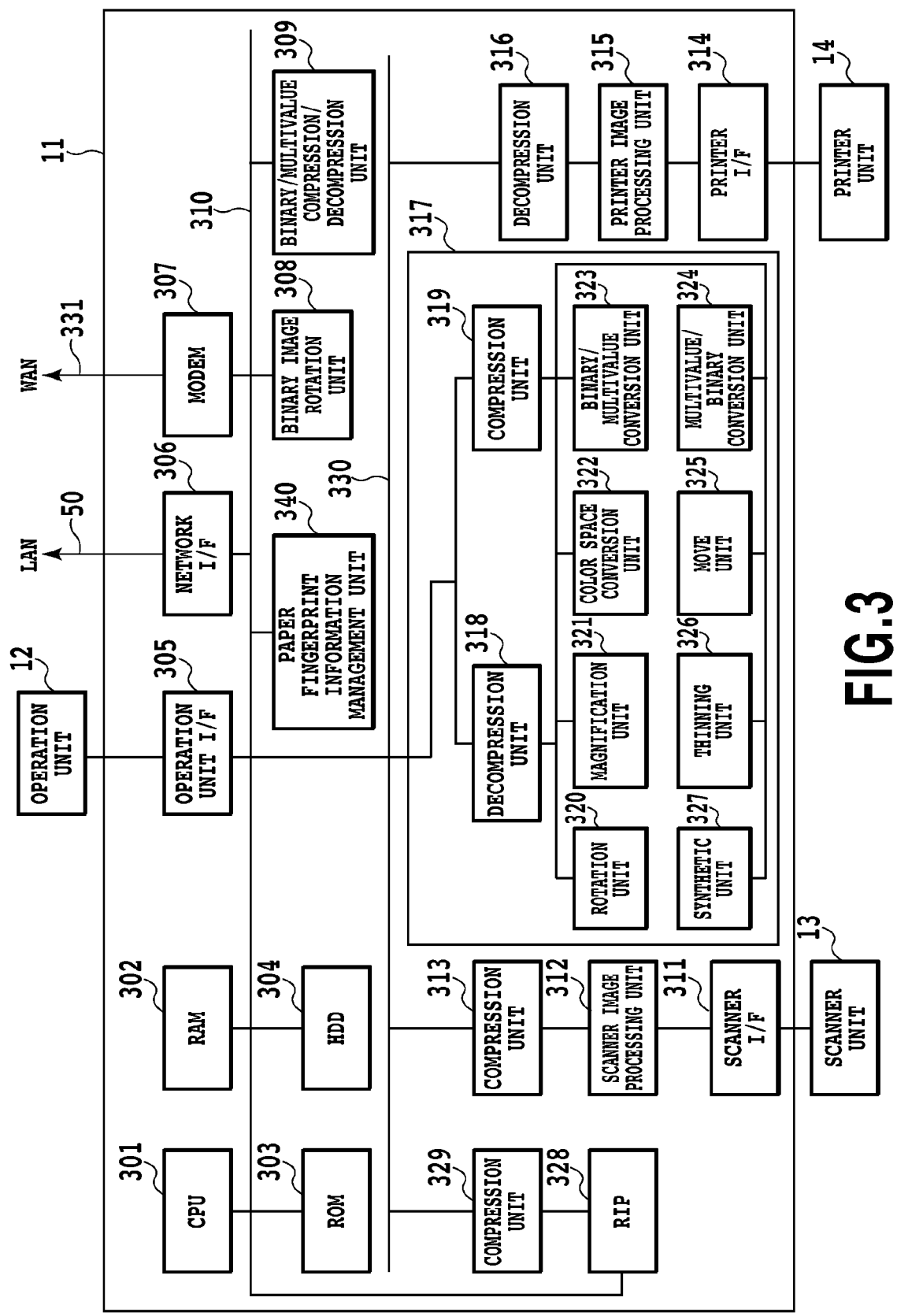
FIG. 3 is a block diagram for describing in detail a control unit of the image forming apparatus of an embodiment of the present invention.

FIG. 3 is a block diagram for describing the controller 11 of the image forming apparatus 10 in more detail.

The controller 11 is electrically connected to the scanner unit 13 and the printer unit 14 while it is connected to the PC 40 or an external device via the LAN 50 or WAN 331. Accordingly, image data and device information can be input into and output from the controller.

The CPU 301 controls overall accesses to various devices being connected based on control programs, etc., stored in a ROM 303, and also controls overall various processings inside the controller. A RAM 302 is a system work memory for operation of the CPU 301, and also serves as a memory for temporarily storing image data. This RAM 302 includes an SRAM which holds stored contents even after the power supply is turned off and a DRAM from which stored contents are deleted after the power supply is turned off. The ROM 303 stores a boot program, etc., of the apparatus. A HDD 304 is a hard disk drive, and can store system software and image data.

An operation unit I/F 305 is an interface unit for connecting a system bus 310 and the operation unit 12. This operation unit I/F 305 receives image data to be displayed on the operation unit 12 from the system bus 310 and outputs it to the operation unit 12, and outputs information input from the operation unit 12 to the system bus 310.

A Network I/F 306 is connected to the LAN 50 and the system bus 310 and performs input and output of information. A modem 307 is connected to the WAN 331 and the system bus 310 and performs input and output of information. A binary image rotation unit 308 converts the direction of the image data before being transmitted. A binary/multivalue compression/decompression unit 309 converts the resolution of image data before being transmitted into a predetermined resolution or a resolution suitable for destination capacity. For compression and decompression, JBIG, MMR, MR, and MH, etc., are used. The image bus 330 is a transmission path for exchanging image data, and has a PCI bus or IEEE 1394.

A scanner image processing unit 312 applies correction, working, and editing to image data received from the scanner unit 13 via the scanner I/F 311. The scanner image processing unit 312 determines whether the received image data is a color document or a monochrome document, or a character document or a photographic document. Then, the determination result is made to accompany the image data. Such accompanying information is referred to as attribute data. Details of processing to be performed in this scanner image processing unit 312 will be described in detail later.

Figure 4:
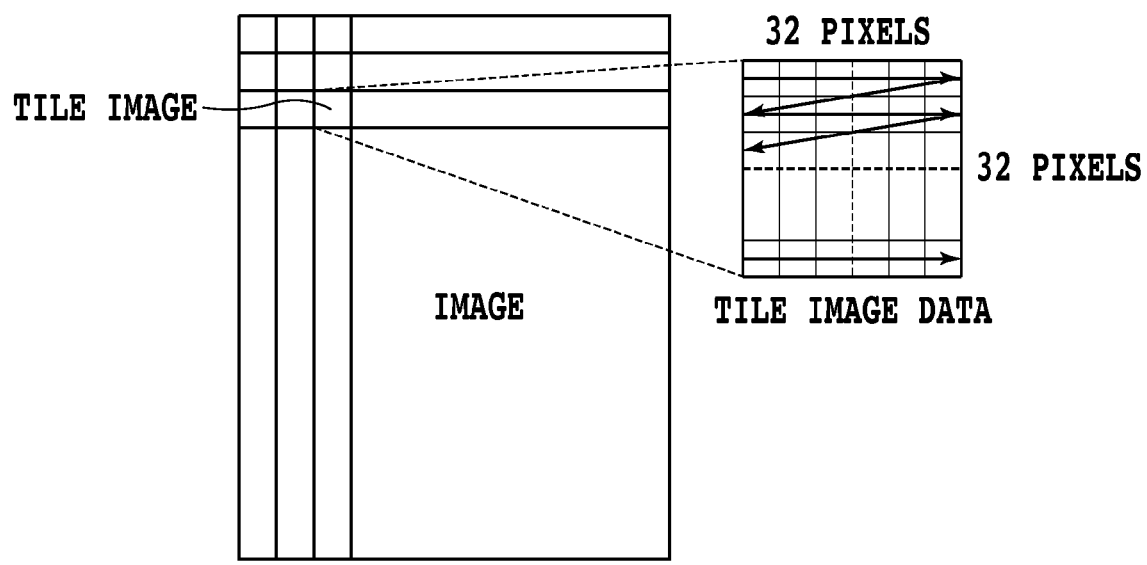
FIG. 4 is a view conceptually showing tile image data of an embodiment of the present invention.

Compression units 313 and 329 receive image data and divide this image data into blocks of 32×32 pixels. Image data of the 32×32 pixels are referred to as tile image data. FIG. 4 conceptually shows the tile image data. On the document (paper medium before being read out), regions corresponding to the tile image data are referred to as tile images. To the tile image data, average luminance information in the blocks of 32×32 pixels and coordinate positions of the tile images on the document are added as header information. Further, the compression units 313 and 329 compress image data composed of the plurality of tile image data. A decompression unit 316 decompresses the image data composed of the plurality of tile image data and then raster-develops the data and transmits these to a printer image processing unit 315.

The printer image processing unit 315 receives the image data transmitted from the decompression unit 316 and applies image processing to the image data while referring to the attribute data accompanying the image data. The image-processed image data is output to the printer unit 14 via the printer I/F 314. Details of the processing in this printer image processing unit 315 will be described later.

The image conversion unit 317 applies predetermined conversion processing to the image data. This processing unit includes the following processing units.

A decompression unit 318 decompresses the received image data. A compression unit 319 compresses the received image data. A rotation unit 320 rotates the received image data. A magnification variation unit 321 applies resolution conversion processing (for example, 600 dpi to 200 dpi) to the received image data. A color space conversion unit 322 converts color space of the received image data. This color space conversion unit 322 can perform known background color removal processing by using a matrix or table, known LOG conversion processing (RGB into CMY), and known output color correction processing (CMY into CMYK). A binary/multivalue conversion unit 323 converts 2-gradation image data into 256-gradation image data. On the contrary, a multivalue/binary conversion unit 324 converts received 256-gradation image data into 2-gradation image data according to a method such as error diffusion processing.

A synthetic unit 327 generates image data of one sheet by synthesizing two received image data. When synthesizing the two image data, a method in which an average of luminance values of pixels to be synthesized is set as a synthetic luminance value or a method in which a luminance value of a pixel having a higher luminance level is set as a luminance value of a synthesized pixel is applied. A method in which a darker pixel is set as a synthesized pixel is also applicable. Further, a method in which a luminance value after being synthesized is determined by a logical OR operation, a logical AND operation, and an EXCLUSIVE OR operation, etc., can also be applied. These synthesizing methods are all known. A thinning unit 326 performs resolution conversion by thinning-out pixels in the received image data to generate image data of ½, ¼, and ⅛, etc. A move unit 325 adds a blank portion to or deletes a blank portion from the received image data.

A RIP 328 receives intermediate data generated based on PDL code data transmitted from the PC 40, etc., and generates bitmap data (multivalue). A paper fingerprint information management unit 340 manages paper fingerprint information obtained through the processing of the scanner image processing unit 312 by associating the information with the plurality of pages of the collating object.

<Detailed Description of Scanner Image Processing Unit 312 (FIG. 5)>

Figure 5:
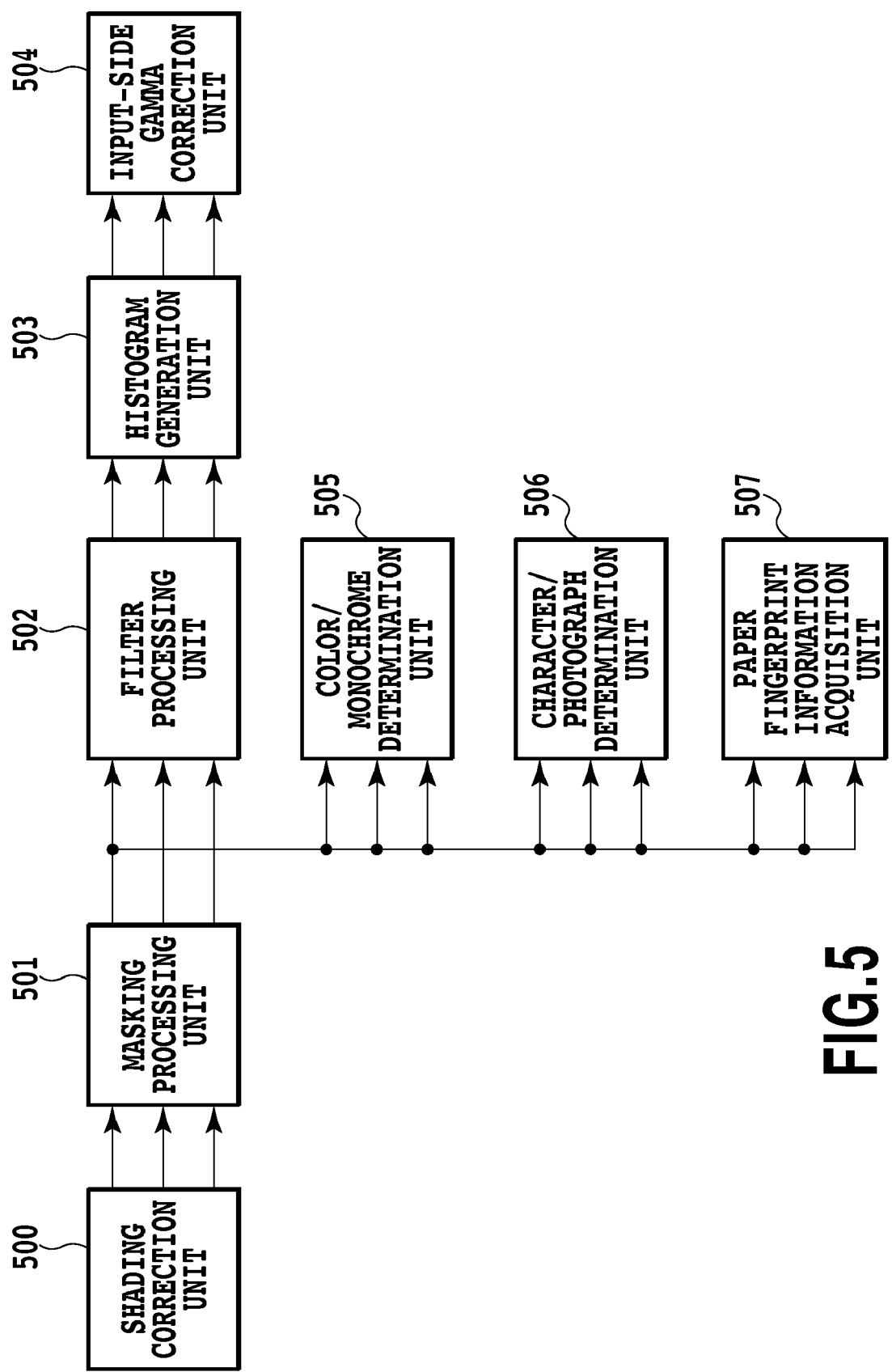
FIG. 5 is a block diagram of a scanner image processing unit of an embodiment of the present invention.

FIG. 5 shows the inside of the scanner image processing unit 312.

The scanner image processing unit 312 receives image data composed of 8-bit RGB luminance signals.

A shading correction unit 500 applies shading correction to the luminance signals. Shading correction is processing for preventing erroneous recognition of the brightness of the document due to scattering in sensitivity among CCDs as described above. Further, as described above, this shading correction unit 500 can perform gain adjustment according to an instruction from the CPU 301.

Then, the luminance signals are converted into standard luminance signals which do not depend on the filter colors of CCDs by a masking processing unit 501.

A filter processing unit 502 arbitrarily corrects a space frequency of the received image data. This processing unit performs arithmetic processing using, for example, a matrix of 7×7. In a copying machine and a multifunction printer, by depressing the character/photograph key 717 shown in FIG. 7, a character mode, a photographic mode, or a character/photograph mode can be selected as a copy mode. Herein, when a user selects a character mode, the filter processing unit 502 applies a character filter to the entire image data. When a photograph mode is selected, a photograph filter is applied to the entire image data. When a character/photograph mode is selected, according to character/photograph determination signals (a part of the attribute data) described later, the filter is switched pixel by pixel as appropriate. In other words, it is determined pixel by pixel whether the photograph filter or the character filter is applied. For the photograph filter, a coefficient which causes smoothing of only high-frequency components is set. This is for making the image roughness imperceptible. For the character filter, a coefficient for stronger edge enhancement is set. This is for expressing character sharpness.

A histogram generation unit 503 samples luminance data of the pixels of the received image data. In detail, luminance data in a rectangular region surrounded by start points and endpoints designated in the main scanning direction and the vertical scanning direction are sampled at fixed pitches in the main scanning direction and the vertical scanning direction. Then, based on the sampling results, histogram data is generated. The generated histogram data is used for estimating a ground level when performing background color removal processing. An input-side gamma correction unit 504 performs conversion into luminance data with nonlinear characteristics by using a table, etc.

A color/monochrome determination unit 505 determines pixels of the received image data are chromatic or achromatic, and makes the determination results to accompany image data as color/monochrome determination signals (a part of attribute data).

A character/photograph determination unit 506 determines whether each pixel of the image data is a pixel of a character, a pixel of dots, a pixel of a dotted character, or a pixel of a solid image based on a pixel value of each pixel and pixel values of peripheral pixels. A pixel which corresponds to none of these is a pixel in a white region. The determination results are made to accompany the image data as character/photograph determination signals (a part of attribute data).

A paper fingerprint information acquisition unit 507 acquires image data of a predetermined region (at least, one or more regions) of RGB image data input into the masking processing unit 501 from the shading correction unit 500 from the masking processing unit 501. Hereinafter, details of paper fingerprint information acquisition processing which the paper fingerprint information acquisition unit 507 performs will be described with reference to FIG. 8.

<Detailed Description of Paper Fingerprint Information Acquisition Unit 507 (FIG. 8)>

Figure 8:
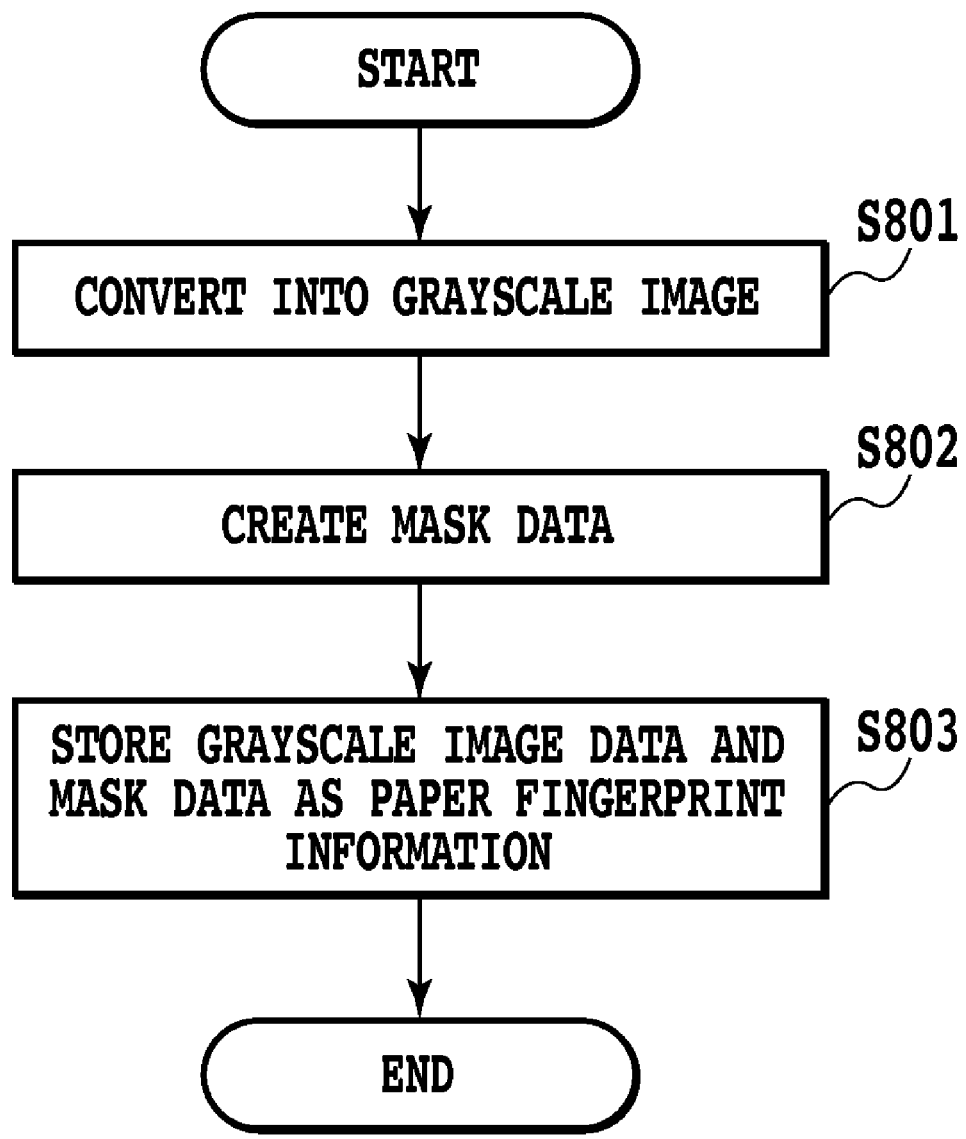
FIG. 8 is a flowchart of paper fingerprint information acquisition processing of an embodiment of the present invention.

FIG. 8 is a flowchart showing paper fingerprint information acquisition processing which the paper fingerprint information acquisition unit 507 of FIG. 5 performs. The paper fingerprint information acquisition unit 507 is controlled by the CPU 301 of the controller 11 as described above.

In Step S801, the paper fingerprint information acquisition unit 507 converts the acquired image data into grayscale image data.

In Step S802, the paper fingerprint information acquisition unit 507 creates mask data for collation by removing printed or handwritten characters, etc., which may cause erroneous determination, based on the grayscale image data. Herein, the mask data is binary data of "0" or "1."

The paper fingerprint information acquisition unit 507 sets a mask data value of a pixel with a luminance signal value not less than a first threshold (that is, bright) to "1" in the gray scale image data. On the other hand, the paper fingerprint information acquisition unit 507 sets a mask data value of a pixel with a luminance signal value less than the first threshold (that is, dark) to "0."

The paper fingerprint information acquisition unit 507 performs the above-described processing for each pixel included in the grayscale image data.

In Step S803, the paper fingerprint information acquisition unit 507 acquires two pieces of data of the grayscale image data and the mask data as paper fingerprint information, and saves these.

Image data itself converted into grayscale in Step S801 is referred to as paper fingerprint information in some cases, however, in the present embodiment, the above-described two pieces of data are referred to as paper fingerprint information.

The paper fingerprint information acquisition unit 507 transmits the paper fingerprint information of the paper fingerprint information acquisition region to the RAM 302 by using a data bus not shown and stores therein.

<Detailed Description of Printer Image Processing Unit 315 (FIG. 6)>

Figure 6:
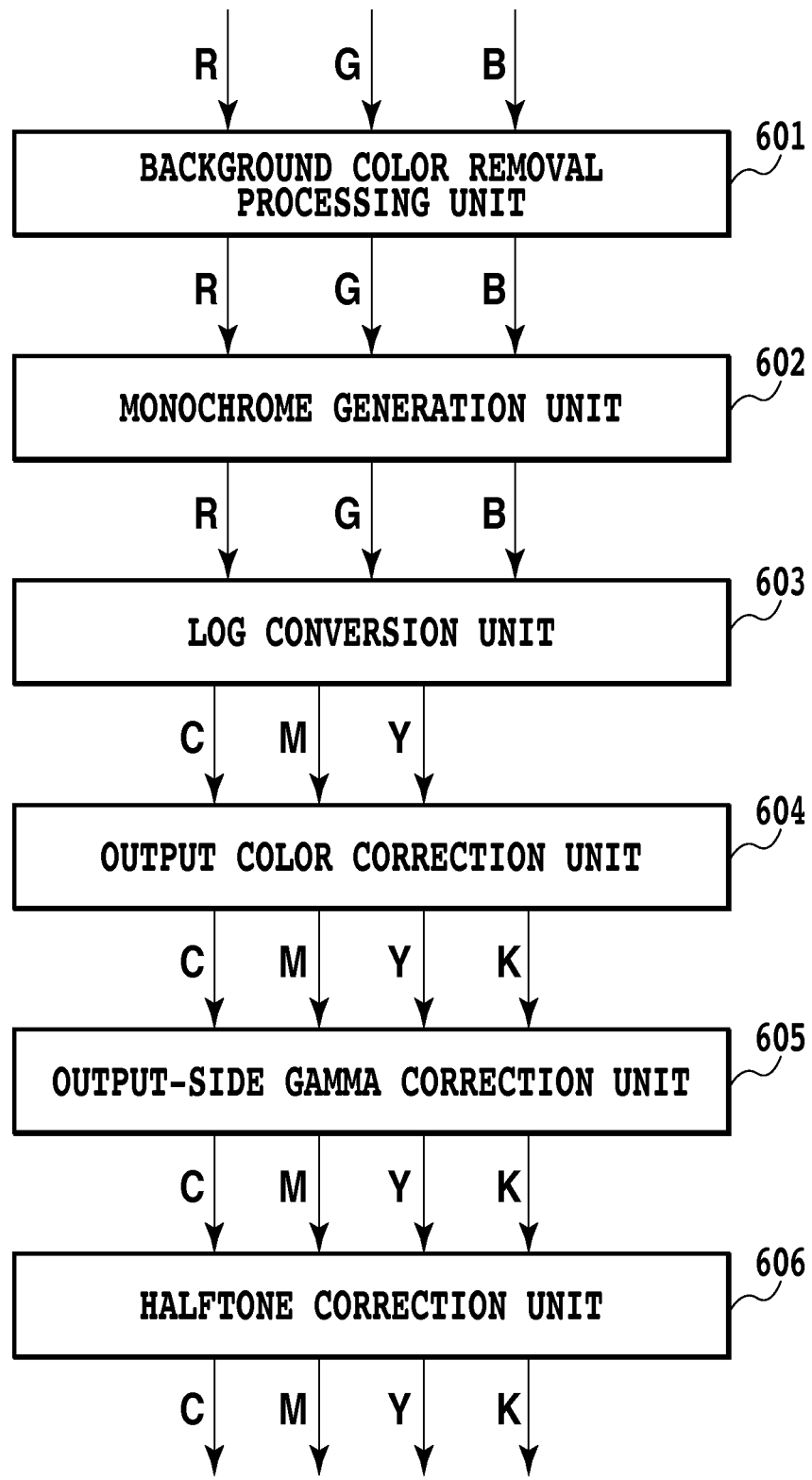
FIG. 6 is a block diagram of a printer image processing unit of an embodiment of the present invention.

Next, the flow of the processing in the printer image processing unit 315 in FIG. 3 will be described with reference to FIG. 6.

The background color removal processing unit 601 performs processing for eliminating (removing) a background color of the image data by using the histogram generated in the scanner image processing unit 312.

A monochrome generation unit 602 converts color data into monochrome data.

A Log conversion unit 603 performs conversion of luminances and densities. For example, the Log conversion unit 603 converts input RGB image data into CMY image data.

An output color correction unit 604 performs output color correction. For example, it converts input CMY image data into CMYK image data by using a table or matrix.

An output-side gamma correction unit 605 performs correction so that a signal value input into the output-side gamma correction unit 605 and a reflected density value after being copied and output are in proportion to each other.

A halftone correction unit 606 performs halftone processing according to the number of gradations of the printer unit 14 to be output. For example, binarization or 32-digitization is applied to received high-gradation image data.

In each processing unit in the scanner image processing unit 312 and the printer image processing unit 315, it is also possible that received image data is output without applying the processings thereto. Passage of data without processing in a certain processing unit is called "passing through the processing unit."

<Paper Fingerprint Information Registration Processing>

The CPU 301 can read out paper fingerprint information of a predetermined region transmitted to the RAM 302 from the paper fingerprint information acquisition unit 507 and register the read-out paper fingerprint information in a server not shown. This registration is performed by executing a program stored in the RAM 302.

<Paper Fingerprint Information Collation Processing (FIG. 9)>

Figure 9:
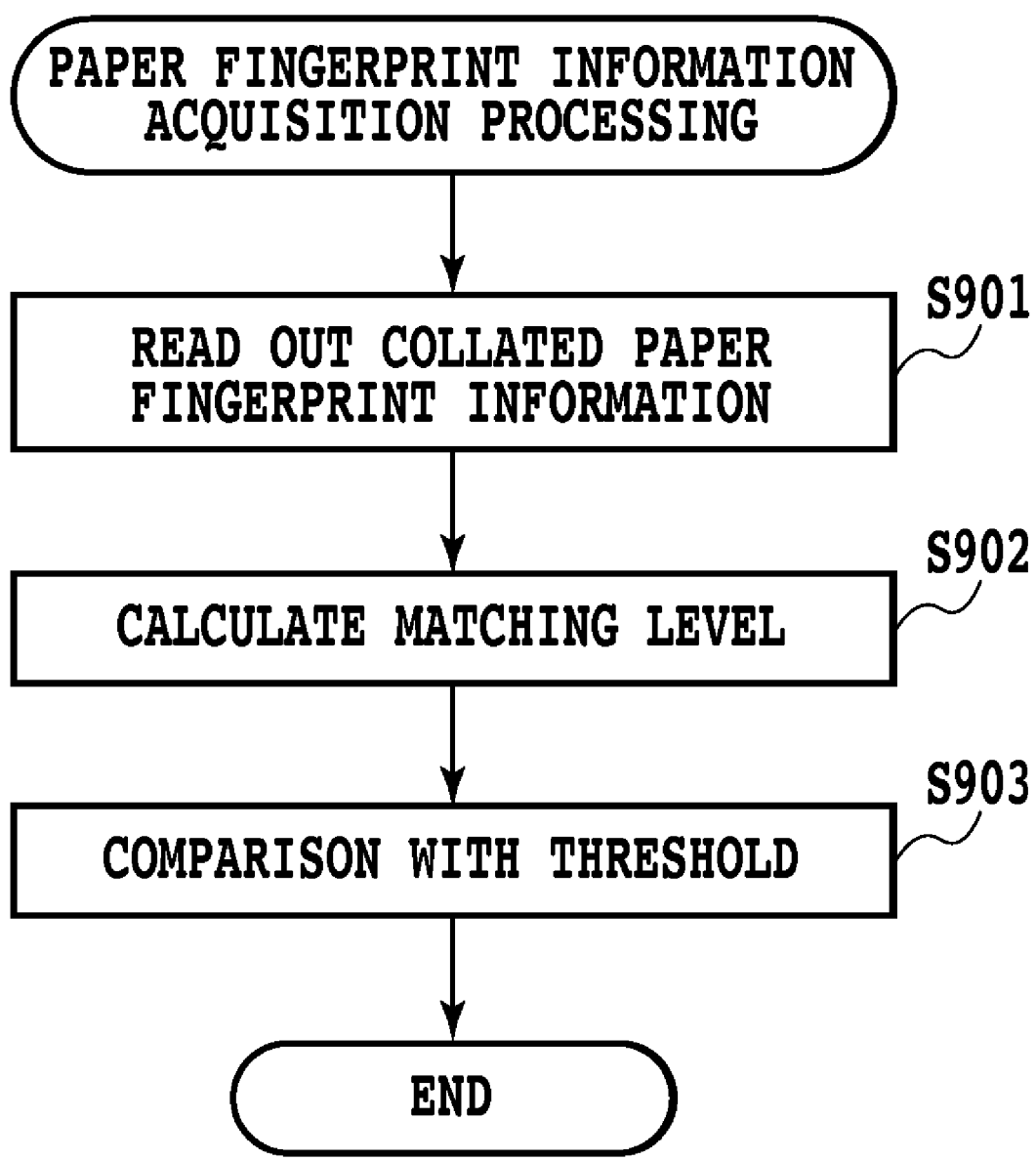
FIG. 9 is a flowchart of paper fingerprint information collation processing of an embodiment of the present invention.

Next, paper fingerprint information collation processing will be described with reference to FIG. 9. FIG. 9 is a flowchart showing the paper fingerprint information collation processing. Steps of this flowchart are controlled overall by the CPU 301.

The CPU 301 can perform control to read out paper fingerprint information transmitted to the RAM 302 from the paper fingerprint acquisition unit 507 and collate this read-out paper fingerprint information with other paper fingerprint information. Other paper fingerprint information means paper fingerprint information stored in another storage medium such as a server, and means collated paper fingerprint information described later.

First, the paper fingerprint information acquisition processing shown in FIG. 8 is executed.

Next, in Step S901, the CPU 301 reads out paper fingerprint information (collated paper fingerprint information) registered in a server from the RAM 302.

In Step S902, the CPU 301 collates the paper fingerprint information (collating paper fingerprint information) transmitted from the paper fingerprint information acquisition unit 507 and the paper fingerprint information read out in Step S901. Therefore, the CPU 301 calculates a matching level between the two pieces of paper fingerprint information by using the following Formula (1).

This calculation processing is for comparing and collating the collated paper fingerprint information and the collating paper fingerprint information (paper fingerprint information transmitted to the RAM 302 from the paper fingerprint information acquisition unit 507).

Between the collating paper fingerprint and the collated paper fingerprint, collation processing is performed by using the function shown in Formula (1). Formula (1) expresses a collation error.

[Mathematical Formula 1]

$$E(i, j) = \frac{\sum_{x,y} \alpha_1(x, y)\alpha_2(x-i, y-j)\{f_1(x, y) - f_2(x, y)\}^2}{\sum_{x,y} \alpha_1(x, y)\alpha_2(x-i, y-j)} \quad (1)$$

In Formula (1), $\alpha_1$ denotes mask data in the paper fingerprint information (collated paper fingerprint) read out in Step S901. $f_1(x, y)$ indicates grayscale image data in the paper fingerprint information (collated paper fingerprint) read out in Step S901. On the other hand, $\alpha_2$ denotes mask data in the paper fingerprint information (collating paper fingerprint) transmitted from the paper fingerprint information acquisition unit 507 in Step S902. $f_2(x, y)$ shows grayscale image data in the paper fingerprint information (collating paper fingerprint) transmitted from the paper fingerprint information acquisition unit 507 in Step S902.

(x, y) of Formula (1) indicates reference coordinates in the collating and collated paper fingerprint information, and (i, j) indicates parameters in which positional deviations of the collating and collated paper fingerprint information are considered. However, in the present invention, the positional deviations are regarded as ignorable, and processing is performed by setting i=0 and j=0.

To consider the meaning of this Formula (1), the case where i=0 and j=0, $\alpha_1(x, y)=1$ (x=0 to n, y=0 to m), and $\alpha_2(x-i, y-j)=1$ (x=0 to n, y=0 to m) will be considered (n and m mean that the collation range includes n pixels laterally and m pixels longitudinally).

In other words, E (0, 0) is obtained when $\alpha_1(x, y)=1$ (x=0 to n, y=0 to m) and $\alpha_2(x-i, y-j)=1$ (x=0 to n, y=0 to m).

Herein, $\alpha_1(x, y)=1$ (x=0 to n, y=0 to m) means that all pixels of the read-out paper fingerprint information (collated paper fingerprint) are bright. In other words, when the read-out paper fingerprint information (collated paper fingerprint) is acquired, this means that no color material such as toner and ink and dust were present on the paper fingerprint acquired region.

$\alpha_2(x-i, y-j)=1$ (x=0 to n, y=0 to m) means that all pixels of the paper fingerprint information currently acquired (paper fingerprint information transmitted from the paper fingerprint information acquisition unit 507 (collating paper fingerprint)) are bright. In other words, when paper fingerprint information which has just been newly acquired is acquired, no color material such as toner and ink and dust were present on the paper fingerprint acquired region.

Thus, when $\alpha_1(x, y)=1$ and $\alpha_2(x-i, y-j)=1$ are satisfied in all pixels, Formula (1) is expressed:

[Mathematical Formula 2]

$$E(0, 0) = \sum_{x=0, y=0}^{n, m} \{f_1(x, y) - f_2(x, y)\}^2$$

as above.

This $\{f_1(x, y) - f_2(x, y)\}^2$ shows a square of a difference between grayscale image data in the read-out paper fingerprint information (collated paper fingerprint) and grayscale image data in the paper fingerprint information transmitted from the paper fingerprint information acquisition unit 507 (collating paper fingerprint). Therefore, Formula (1) results in a sum of squares of differences in the pixels between the two pieces of paper fingerprint information. In other words, the more pixels whose $f_1(x, y)$ and $f_2(x, y)$ are similar to each other, the smaller the value of E(0, 0).

<Meaning of α>

The numerator of Formula (1) means a result of multiplying $\{f_1(x, y) - f_2(x, y)\}^2$ by $\alpha_1$ and $\alpha_2$ (specifically, a sum is calculated according to the sigma symbol (Σ)). As $\alpha_1$ and $\alpha_2$, a dark-colored pixel is expressed as 0, and a light-colored pixel is expressed as 1.

Therefore, when either (or both) of $\alpha_1$ and $\alpha_2$ is zero, $\alpha_1\alpha_2\{f_1(x, y)-f_2(x-i, y-j)\}^2$ becomes zero.

In other words, when in either (or both) of the two pieces of paper fingerprint information, a target pixel has a dark color, the density difference in this pixel is not considered. This is done to omit a pixel on which dust or color material was present.

Through this processing, the number to be summed up according to the sigma symbol is increased or decreased, so that normalizing is performed by dividing it by the total number $\Sigma\alpha_1(x, y) \alpha_2(x-i, y-j)$.

In Step S903, the CPU 301 compares the collation error of the two pieces of paper fingerprint information calculated in Step S902 and a predetermined threshold, and determines whether the collated paper fingerprint and the collating paper fingerprint "match" or "mismatch."

<Description of Operation Screen (FIG. 7)>

Next, a copy standard screen on the operation panel of the present invention will be described with reference to FIG. 7. The image forming apparatus 10 of this embodiment starts the copy standard screen as a default display when the power supply is turned on.

A message line 701 displays a copy job status by means of a message.

A magnification display 702 displays a set magnification or a magnification automatically set according to a copy mode in percent figures.

A sheet size display 703 displays a selected output sheet, and when auto sheet selection is set, displays a message informing of the auto sheet.

A set number display 704 displays a number of sheets to be copied.

A reduction key 705 is used in the case of reduced scale copy.

A same-magnification key 706 is used when restoring the setting of reduction or magnification to the setting of the same magnification.

An enlargement key 707 is used in the case of making enlargements.

The zoom key 708 is used when an operator desires to make an enlargement or reduction by setting the magnification in small units.

A sheet select key 709 is used for designating an output sheet.

A sorter key 710 is used for setting a mode of sorting or stapling.

A double-side key 711 is used for setting a double-sided copy mode.

A density display 712 indicates a current density, and the left display portion indicates a lower density, and the right display portion indicates a higher density. The display of the density display 712 changes in conjunction with a lighter key 713 and a darker key 715.

The lighter key 713 is used for reducing the density.

An automatic key 714 is used for using a mode in which the density is automatically determined.

The darker key 715 is used for increasing the density.

A character key 716 is used for setting the "character mode" in which a density suitable for copying a character document is automatically set.

A character/photograph key 717 is used for setting the "character/photograph mode" in which a density suitable for a document containing photographs in a mixed manner is automatically set.

An applied mode key 718 is used for setting various copy modes which cannot be set on the copy standard screen.

The reference numeral 719 denotes a print status key, and is used for confirming a current print status. The print status key 719 appears not only on the copy standard screen but also always on this position, and whenever this key is depressed, a print status can be confirmed.

A paper fingerprint information registration tab 720 is for selecting collated paper fingerprint information registration processing. This paper fingerprint information registration processing will be described later.

A paper fingerprint information collation tab 721 is for selecting paper fingerprint information collation processing. This paper fingerprint information collation processing will also be described later.

Figure 7:
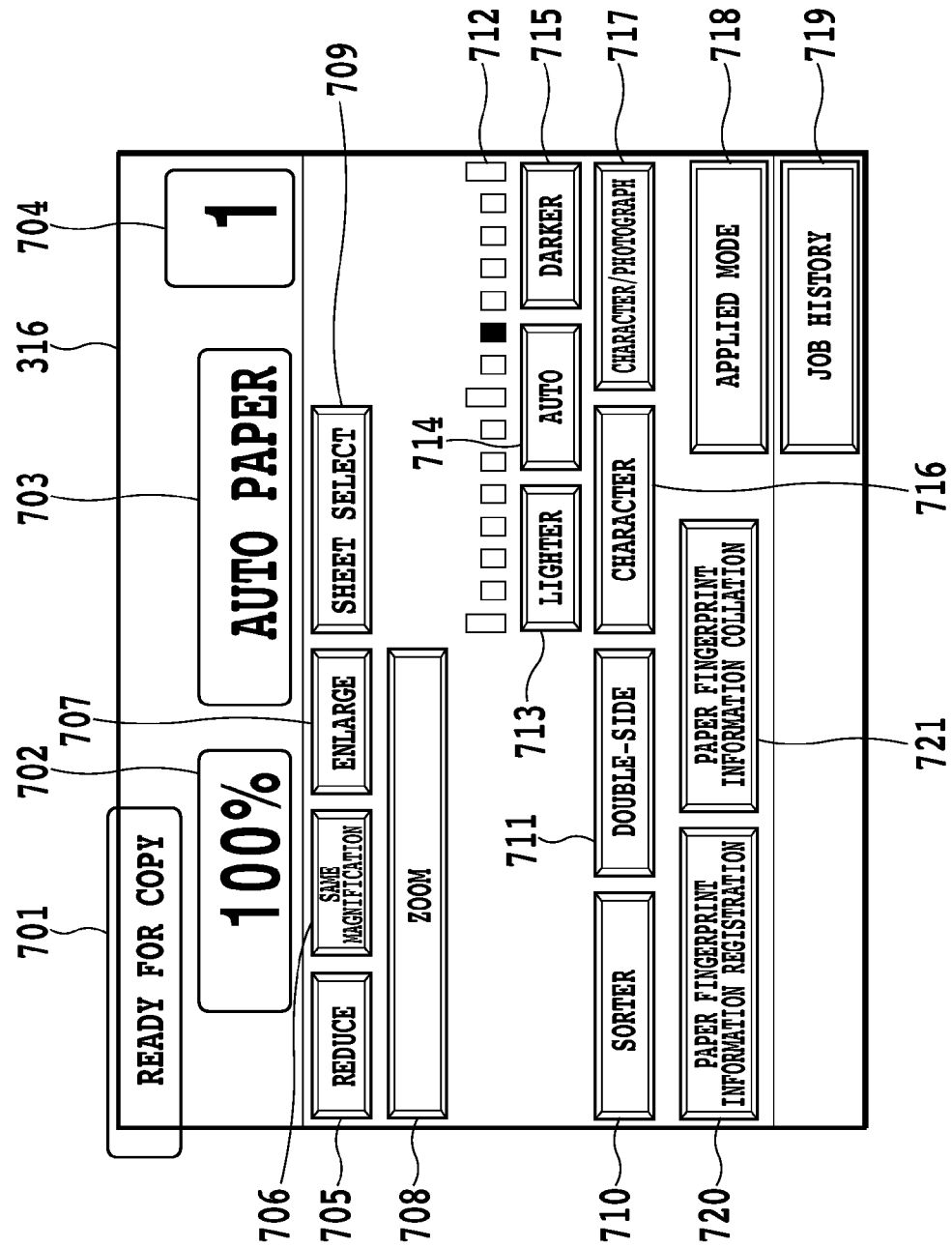
FIG. 7 is a view showing a display screen of an operation unit of an embodiment of the present invention.

When a start key (not shown) is depressed, based on print setting set by various keys of FIG. 7, printing processing is executed in the image forming apparatus 10.

<Operations when the Paper Fingerprint Information Registration Tab 720 is Depressed (FIG. 16)>

Subsequently, paper fingerprint information registration processing to be executed when a paper fingerprint information registration tab 720 shown in FIG. 7 (and then the start key is depressed) by a user will be described with reference to FIG. 16.

In Step S1601, the CPU 301 performs control so as to transmit a document read out by the scanner unit 13 to the scanner image processing unit 312 via the scanner I/F 311 as image data.

In Step S1602, the scanner image processing unit 312 sets a gain adjustment value smaller than a general gain adjustment value into the shading correction unit 500. Then, luminance signal values obtained by applying the smaller gain adjustment value to the image data are output to the paper fingerprint information acquisition unit 507. Thereafter, based on the output data, the paper fingerprint information acquisition unit 507 acquires paper fingerprint information. Then, the acquired paper fingerprint information is transmitted to the RAM 302 by using a data bus not shown.

In the paper fingerprint acquisition technique, a fiber pattern is acquired from a white region of a paper medium, it is essential that slightly dark image data are obtained. Therefore, in the present embodiment, by setting a gain adjustment value smaller than the general gain adjustment value by the scanner image processing unit 312, dark image data for paper fingerprint information acquisition were obtained. However, the method for obtaining dark image data is not limited to this. For example, a method of scanning with a reduced light amount is also possible.

In Step S1603, the CPU 301 stores paper fingerprint information on the HDD 304 of the image forming apparatus by using the paper fingerprint information management unit 340. At this time, grayscale data in the paper fingerprint information is stored as tile data of a region of n pixels laterally and m pixels longitudinally on the HDD 304. In other words, after paper fingerprint information has already been stored on the HDD 304, when other paper fingerprint information is stored, the paper fingerprint information is stored in a storage region following the registered paper fingerprint information as if tiles are arranged in order, so that synthesized paper fingerprint information is formed (a conceptual view of this tile image data is described in FIG. 17).

In Step S1604, the CPU 301 determines whether a subsequent document is placed on the scanner unit 13. In Step S1604, when the CPU 301 determines that a subsequent document is placed on the scanner unit 13, the process advances to Step S1601. In Step S1604, when the CPU 301 determines that no subsequent document is placed on the scanner unit 13, the process advances to Step S1605.

In Step S1605, after the CPU 301 receives a management number issued from the server, it registers this management number, stored paper fingerprint information acquired from the paper fingerprint information management unit 340, and information on the paper fingerprint information regions into the server by associating these with each other.

As the information on the paper fingerprint information regions, paper fingerprint information corresponding to the respective documents are held as tile data in the scanning order of the documents in Step S1603. In other words, information on the paper fingerprint information regions means positional information indicating which region's tile image data corresponds to which page document's paper fingerprint information.

In Step S1606, the CPU 301 performs control so as to display the management number on the display screen.

It is also possible to perform control so as to print the management number by the image forming apparatus 10.

Still another method is also allowed in which the number of times of storing the paper fingerprint information on the HDD 304 by the paper fingerprint information management unit 340 is managed as a paper fingerprint information storage number, and when this paper fingerprint information storage number exceeds a predetermined threshold, paper fingerprint information is registered into the server. In this case, the CPU 301 determines whether a management number has already been issued from the server, and when it has already been issued, the CPU registers this management number and the paper fingerprint information in the server by associating these with each other, and even if the registration is divided into a plurality of times, the divided registrations are managed by one management number.

<Operations when the Paper Fingerprint Information Collation Processing Tab is Depressed (FIG. 18)>

Subsequently, operations when the paper fingerprint information collation tab 721 shown in FIG. 7 is depressed by a user and then the start key is depressed after a management number is input will be described with reference to FIG. 18.

In Step S1701, the CPU 301 performs control so as to transmit a document read out by the scanner unit 13 to the scanner image processing unit 312 via the scanner I/F 311 as image data.

In Step S1702, the scanner image processing unit 312 applies the processing shown in FIG. 5 to this image data to generate new image data and attribute data. In addition, the scanner image processing unit makes this attribute data accompany the image data.

Further, in this Step S1702, the paper fingerprint information acquisition unit 507 inside the scanner image processing unit 312 acquires paper fingerprint information from the document read out in Step S1701. Then, it transmits the acquired paper fingerprint information to the RAM 302 by using a data bus not shown.

In Step S1703, the CPU 301 stores the paper fingerprint information transmitted to the RAM 302 in Step S1702 on the HDD 304 of the image forming apparatus by using the paper fingerprint information management unit 340. At this time, the CPU 301 acquires information on the paper fingerprint information regions registered in the server, and considers the position of tile image data corresponding to the read-out page number. Then, as in the case of Step S1603 of FIG. 16, the CPU 301 stores grayscale data in the paper fingerprint information on the HDD 304 as tile data of a region including n pixels laterally and m pixels longitudinally.

In Step S1704, the CPU 301 determines whether a subsequent document is placed on the scanner unit 13. In Step S1704, when the CPU 301 determines that a subsequent document is placed on the scanner unit 13, the process advances to Step S1701. In Step S1704, when the CPU 301 determines that no subsequent document is placed on the scanner unit 13, the process advances to Step S1705.

In Step S1705, the CPU 301 acquires paper fingerprint information registered in the server while associated with the input management number. Then, the CPU transmits the acquired information to the RAM 302 by using a data bus not shown.

In Step S1706, the CPU 301 collates the paper fingerprint information registered in the server and the paper fingerprint information acquired through the paper fingerprint information acquisition unit 507. This collation processing is as described in <Paper fingerprint information collation processing> with reference to FIG. 9.

In Step S1707, the CPU 301 performs control so as to display the result (match or mismatch) obtained through the <Paper fingerprint information collation processing> on the display screen of the operation unit.

Figure 19:
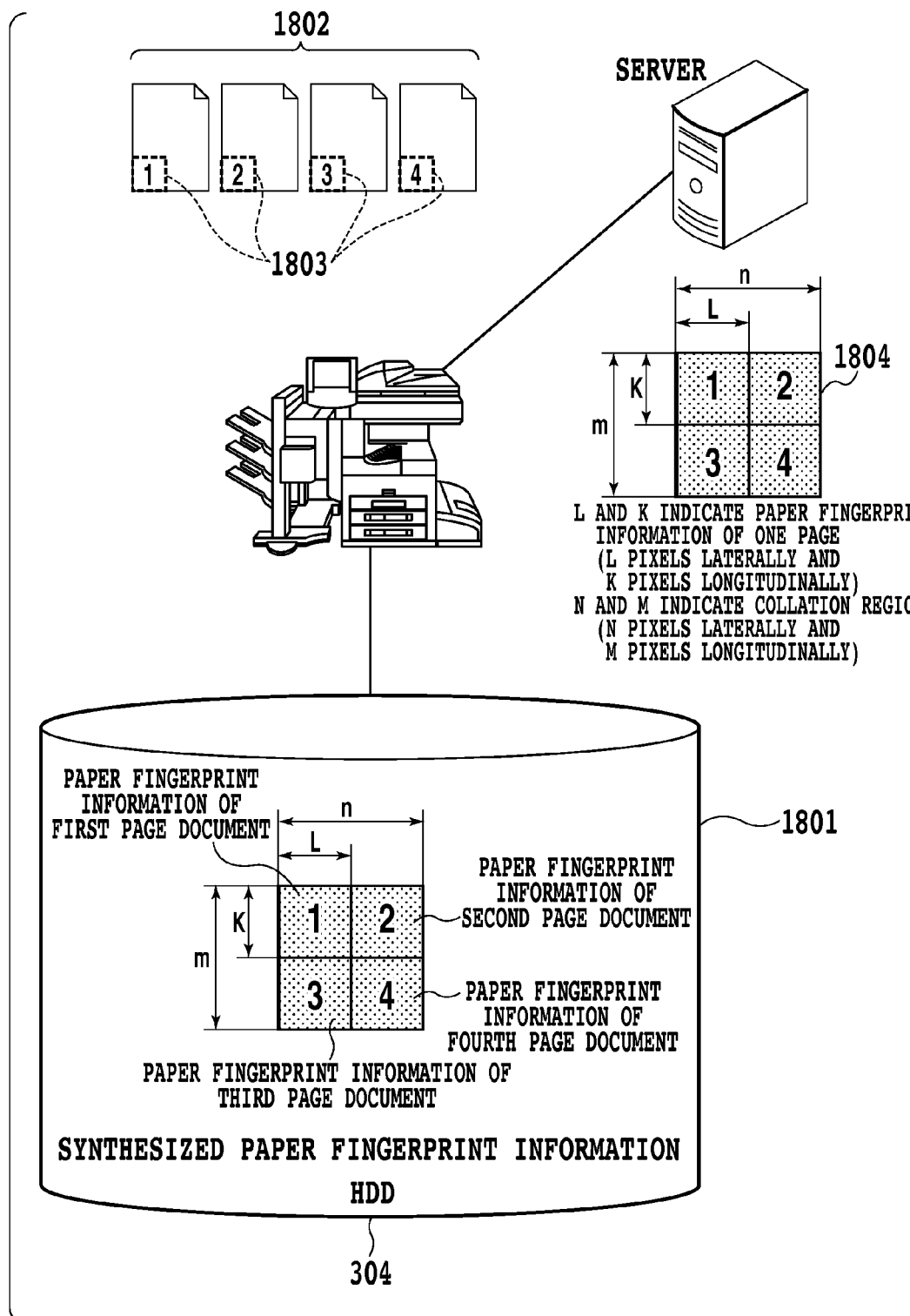
FIG. 19 is a conceptual view of paper fingerprint information collation processing in the first embodiment of the present invention.

A conceptual view of this processing is shown in FIG. 19.

In FIG. 19, the reference numeral 1802 expresses a paper document as a collating object consisting of four pages, and an extraction area group in which paper fingerprint information is read out from each page is expressed by the reference numeral 1803.

Figure 18:
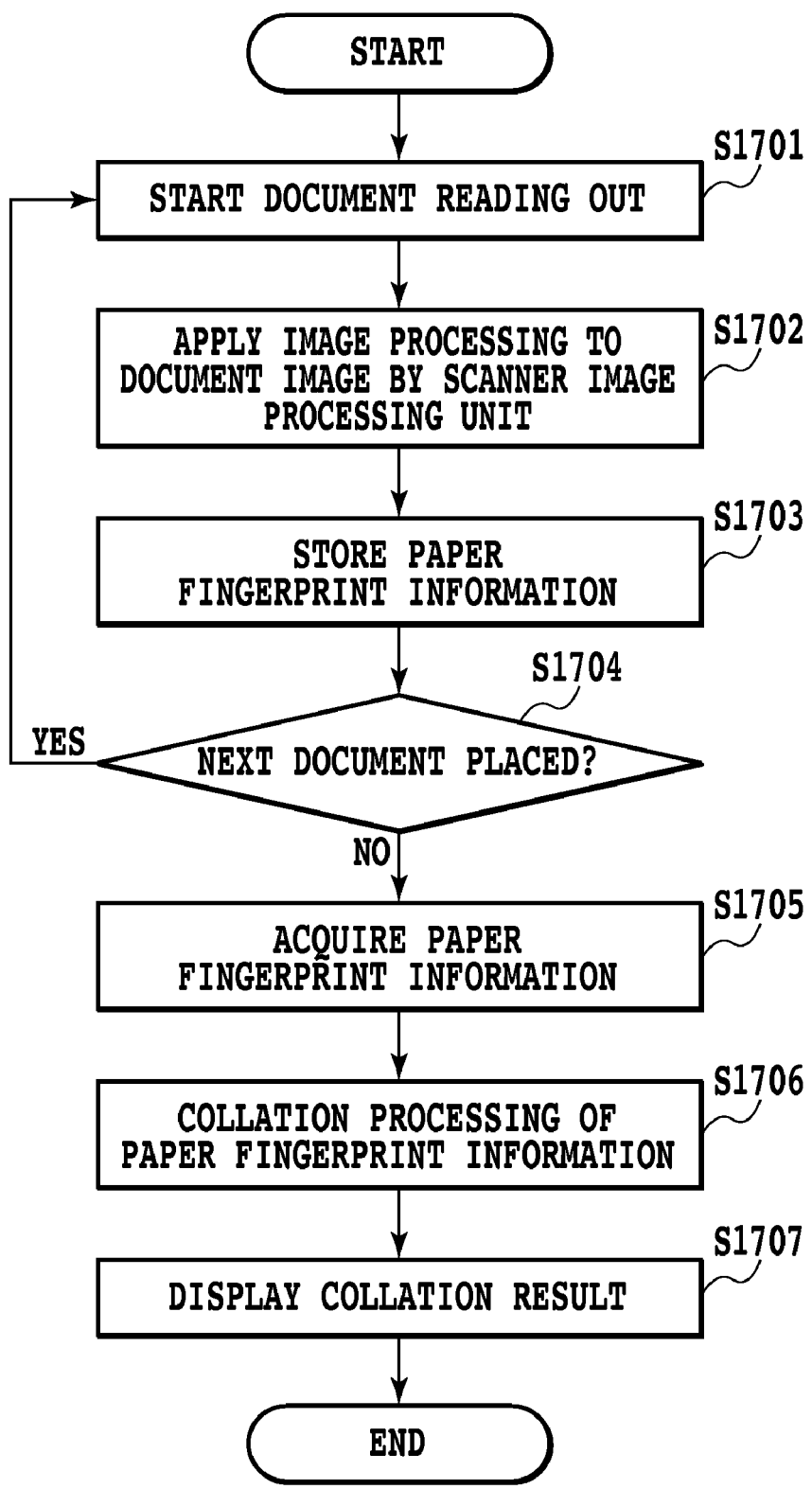
FIG. 18 is a view describing operations of paper fingerprint information collation processing in the first embodiment of the present invention.

The reference numeral 1801 expresses the HDD 304, and expresses a state where grayscale data in paper fingerprint information extracted from the extraction area group 1803 of the paper document 1802 as the collating object are stored on the HDD 304 through the processings of Steps S1701 to S1704 of FIG. 18.

FIG. 19 shows a state where paper fingerprint information corresponding to the first page document is stored as an upper left tile from the information on the paper fingerprint information regions registered in the server. FIG. 19 shows a state where paper fingerprint information corresponding to the second page document is stored as an upper right tile from the information on the paper fingerprint information regions registered in the server. FIG. 19 shows a state where paper fingerprint information corresponding to the third page document is stored as a lower left tile from the information on the paper fingerprint information regions registered in the server. Further, FIG. 19 shows a state where paper fingerprint information corresponding to the fourth page document is stored as a lower right tile from the information on the paper fingerprint information regions registered in the server.

L and K shown in FIG. 19 express a paper fingerprint region of one page (L pixels laterally, and K pixels longitudinally), and n and m express a collation region (n pixels laterally, and m pixels longitudinally).

The reference numeral 1804 expresses collated paper fingerprint information registered in the server, and this collated paper fingerprint information 1804 is acquired and collated with collating paper fingerprint information stored on the HDD 304. This collation processing is as described in <Paper fingerprint information collation processing> with reference to FIG. 9.

As described above, in this embodiment, the originality as a whole of a paper document consisting of a plurality of pages can be proved.

Second Embodiment

Figure 17:
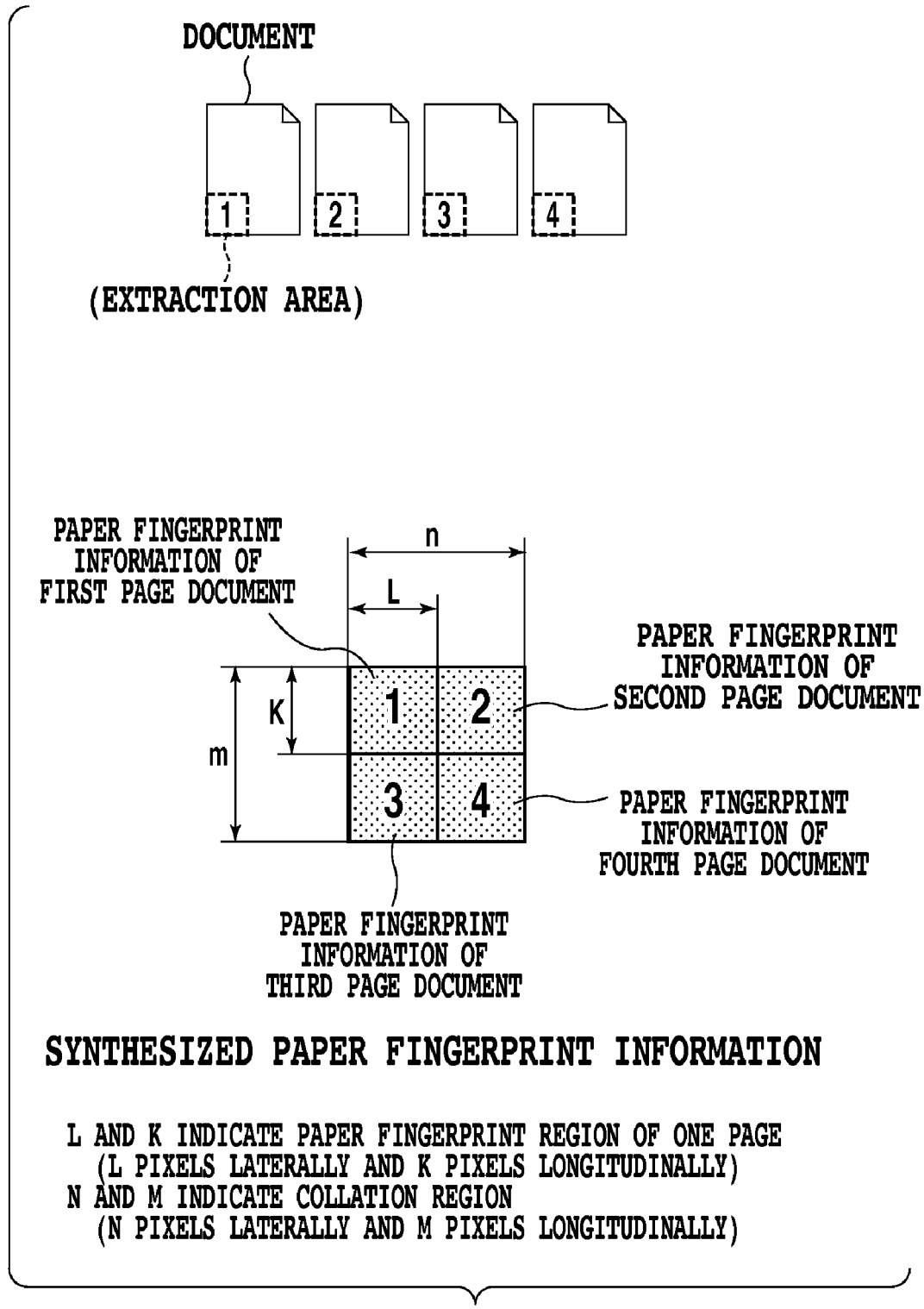
FIG. 17 is a conceptual view of processing when creating paper fingerprint information in the first embodiment of the present invention.

In the above-described first embodiment, as the paper fingerprint information registered in the server, paper fingerprint information obtained by synthesizing grayscale data of paper fingerprint information of the pages shown in FIG. 17 as tile data is used. In this case, by using the information on the paper fingerprint information regions, if the document reading out page order at the time of the paper fingerprint registration and the document reading out page order at the time of collation do not match each other, the collation result of the paper fingerprint information is not "match" (=original), either. In other words, collation based on the page order of the paper document consisting of the plurality of pages is performed.

On the other hand, in the paper document consisting of a plurality of pages, if it is not necessary to especially consider the page order, in the registration and collation, collation can be performed according to a method in which the reading out order (collation order) of the paper document is not considered, and a system for proving the originality of all pages of the paper document is required.

In this second embodiment, the originality as a whole of a paper document consisting of a plurality of pages can be proved without considering the page order.

<Operations when the Paper Fingerprint Information Registration Tab 720 is Depressed (FIG. 12)>

Figure 12:
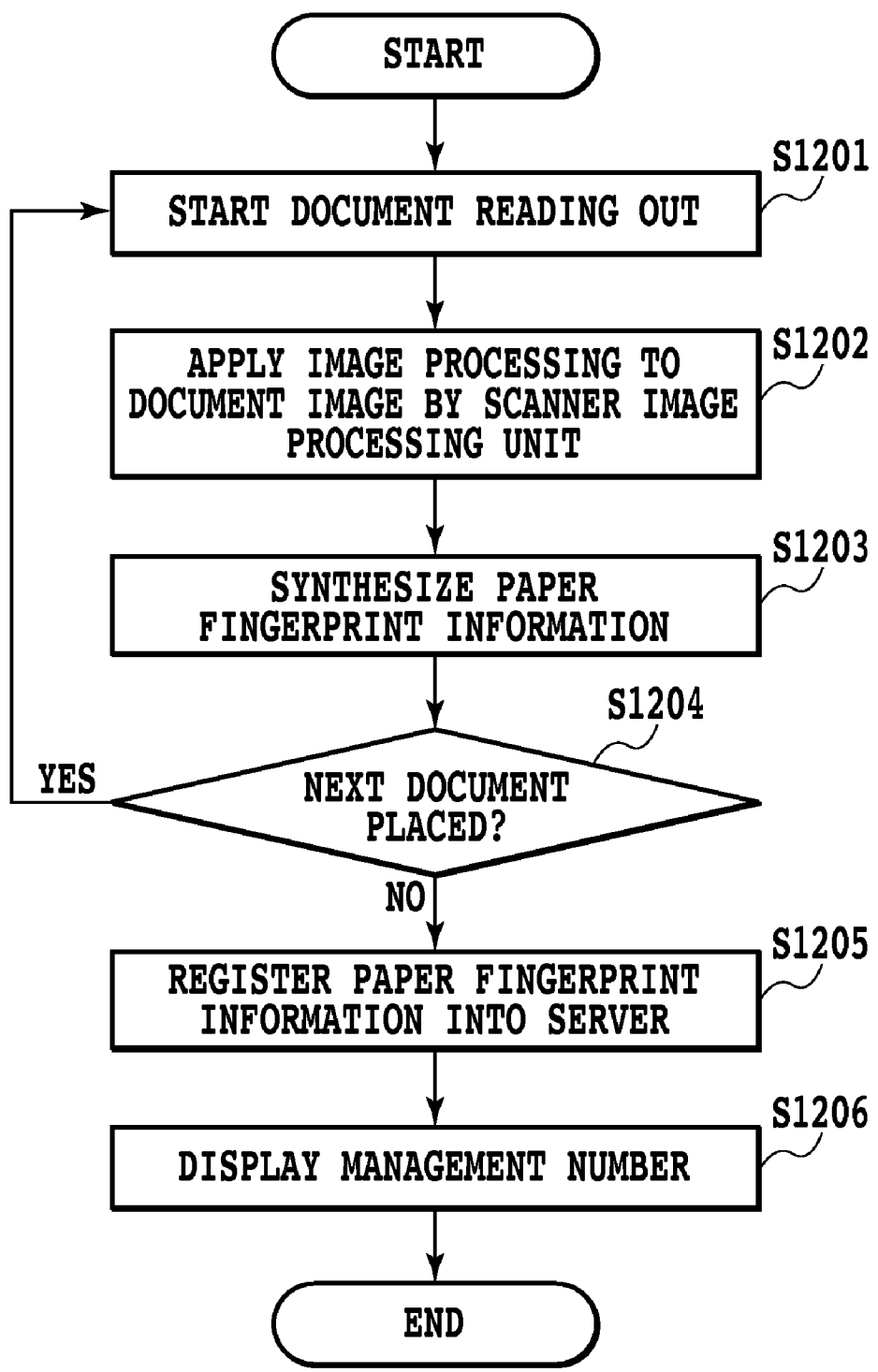
FIG. 12 is a view describing operations when depressing a fingerprint information registration tab in a second embodiment of the present invention.

In the second embodiment, paper fingerprint information registration processing to be executed when the paper fingerprint information registration tab 720 shown in FIG. 7 is depressed by a user (and then the start key is depressed) will be described with reference to FIG. 12.

In Step S1201, the CPU 301 performs control so as to transmit a document read out by the scanner unit 13 to the scanner image processing unit 312 via the scanner I/F 311 as image data.

In Step S1202, the scanner image processing unit 312 sets a gain adjustment value smaller than a general gain adjustment value into the shading correction unit 500. Then, the scanner image processing unit outputs luminance signal values obtained by applying the smaller gain adjustment value to the image data to the paper fingerprint information acquisition unit 507. Thereafter, based on the output data, the paper fingerprint information acquisition unit 507 acquires paper fingerprint information. Then, it transmits the acquired paper fingerprint information to the RAM 302 by using a data bus not shown.

In the paper fingerprint acquisition technique, as long as a fiber pattern is acquired from a white region, it is essential to obtain dark image data. Therefore, in this embodiment, by setting a gain adjustment value smaller than a general gain adjustment value by the scanner image processing unit 312, dark image data for paper fingerprint information acquisition was obtained. However, the method for obtaining the dark image data is not limited to this. For example, a method of scanning by reducing the light amount is also possible.

In Step S1203, the CPU 301 generates one piece of paper fingerprint information by synthesizing two pieces of paper fingerprint information by the synthetic unit 327 when a plurality of paper fingerprint information are in the RAM 302, and manages it by the paper fingerprint information management unit 340. At this time, grayscale data in the paper fingerprint information becomes data of a region of n pixels laterally and m pixels longitudinally (a conceptual view of this is described in FIG. 13).

In Step S1204, the CPU 301 determines whether a subsequent document has been placed on the scanner unit 13. In Step S1204, when the CPU 301 determines that a subsequent document is placed on the scanner unit 12, the process advances to Step S1201. In Step S1204, when the CPU 301 determines no subsequent document is placed on the scanner unit 12, the process advances to Step S1205.

In Step S1205, the CPU 301 receives a management number issued from the server, and then registers this management number and stored paper fingerprint information acquired from the paper fingerprint information management unit 340 into the server by associating these with each other.

In Step S1206, the CPU 301 performs control so as to display the management number on the display screen. It is also possible that the CPU performs control so as to print this management number by the image forming apparatus 10.

The CPU 301 may store the paper fingerprint information on the HDD 304 as follows. That is, the CPU 301 stores the paper fingerprint information on the HDD 304 of the image forming apparatus by using the paper fingerprint information management unit 340. Then, it develops the paper fingerprint information into the RAM 302 as appropriate. Then, after generating one piece of paper fingerprint information by synthesizing two pieces of paper fingerprint information by the synthetic unit 327, the paper fingerprint information may be stored on the HDD 304.

Next, creation of the paper fingerprint information shown in FIG. 12 will be described with reference to the conceptual view of FIG. 13.

Figure 13:
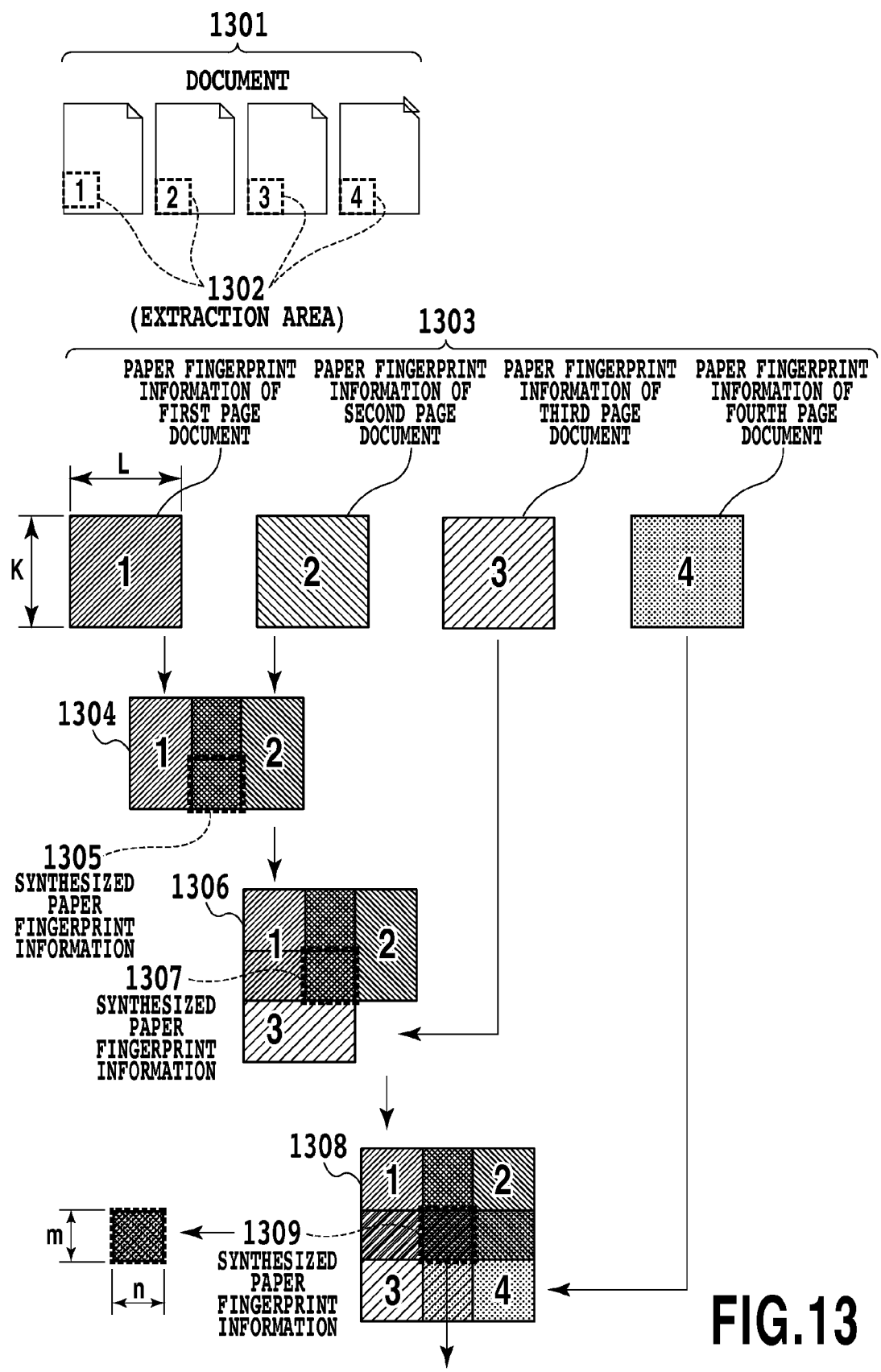
FIG. 13 is a conceptual view of processing when creating paper fingerprint information in the second embodiment of the present invention.

In FIG. 13, the reference numeral 1301 expresses a paper document whose paper fingerprint is to be registered, consisting of four pages, and an extraction area group in which paper fingerprint information is read out from each page is expressed by the reference numeral 1302.

The reference numeral 1303 expresses paper fingerprint information extracted from the extraction area group 1302, and illustrates paper fingerprint information of the first through fourth pages. L and K in the figure express a paper fingerprint region (L pixels laterally and K pixels longitudinally) of one page.

The reference numeral 1304 expresses generation of one piece of paper fingerprint information 1305 by synthesizing first page and second page paper fingerprint information by the synthetic unit 327.

The reference numeral 1306 expresses generation of one piece of paper fingerprint information 1307 by synthesizing the paper fingerprint information 1305 and the third page fingerprint information by the synthetic unit 327.

Similarly, the reference numeral 1308 expresses generation of one piece of paper fingerprint information 1309 by synthesizing the paper fingerprint information 1307 and the fourth page paper fingerprint information by the synthetic unit 327.

Therefore, the paper fingerprint information 1309 is created by synthesizing the first, second, third, and fourth page paper fingerprint information. n and m in the figure express lateral n pixels and longitudinal m pixels of a paper fingerprint information region (collation region).

In FIG. 13, the paper fingerprint information 1305, 1307, and 1309 created based on a paper fingerprint information group 1303 are expressed to be smaller in size than the paper fingerprint information group 1303 (that is, L>n, K>m). However, this expression is for the sake of expressing the synthesis processing, and they may have a size equivalent to that of the paper fingerprint information group 1303 (L=n, K=m).

<Operations when the Paper Fingerprint Information Collation Processing Tab is Depressed (FIG. 14)>

Subsequently, in the second embodiment, operations when the paper fingerprint information collation tab 721 shown in FIG. 7 is depressed by a user and then the start key is depressed after a management number is input will be described with reference to FIG. 14.

In Step S1401, the CPU 301 performs control so as to transmit a document read out by the scanner unit 13 to the scanner image processing unit 312 via the scanner I/F 311 as image data.

In Step S1402, the scanner image processing unit 312 generates new image data and attribute data by applying the processing of FIG. 5 to the image data. In addition, the scanner image processing unit makes this attribute data accompany the image data.

Further, in this Step S1402, the paper fingerprint information acquisition unit 507 inside the scanner image processing unit 312 acquires paper fingerprint information from the document read out in Step S1401. Then, it transmits the acquired paper fingerprint information to the RAM 302 by using a data bus not shown.

In Step S1403, when a plurality of paper fingerprint information are in the RAM 302, the CPU 301 generates one piece of paper fingerprint information by synthesizing two pieces of paper fingerprint information by the synthetic unit 327. The synthesized paper fingerprint information is managed by the paper fingerprint information management unit 340.

Another method may be used in which CPU 301 stores the paper fingerprint information on the HDD 304 of the image forming apparatus by using the paper fingerprint information management unit 340, and the CPU develops the paper fingerprint information into the RAM 302.

In Step S1404, the CPU 301 determines whether a subsequent document is placed on the scanner unit 13. In Step S1404, when the CPU 301 determines that a subsequent document is placed on the scanner unit 13, the process advances to Step S1401. In Step S1404, when the CPU 301 determines that no subsequent document is placed, the process advances to Step S1405.

In Step S1405, the CPU 301 acquires paper fingerprint information registered in the server in a state where it is associated with an input management number. Then, the CPU transmits the acquired information to the RAM 302 by using a data bus not shown.

In Step S1406, the CPU 301 collates the paper fingerprint information registered in the server and the paper fingerprint information acquired through the paper fingerprint information acquisition unit 507. This collation processing is as described in <Paper fingerprint information collation processing> with reference to FIG. 9.

In Step S1407, the CPU 301 performs control so as to display the result (match or mismatch) obtained through the <Paper fingerprint information collation processing> on the display screen of the operation unit.

Figure 15:
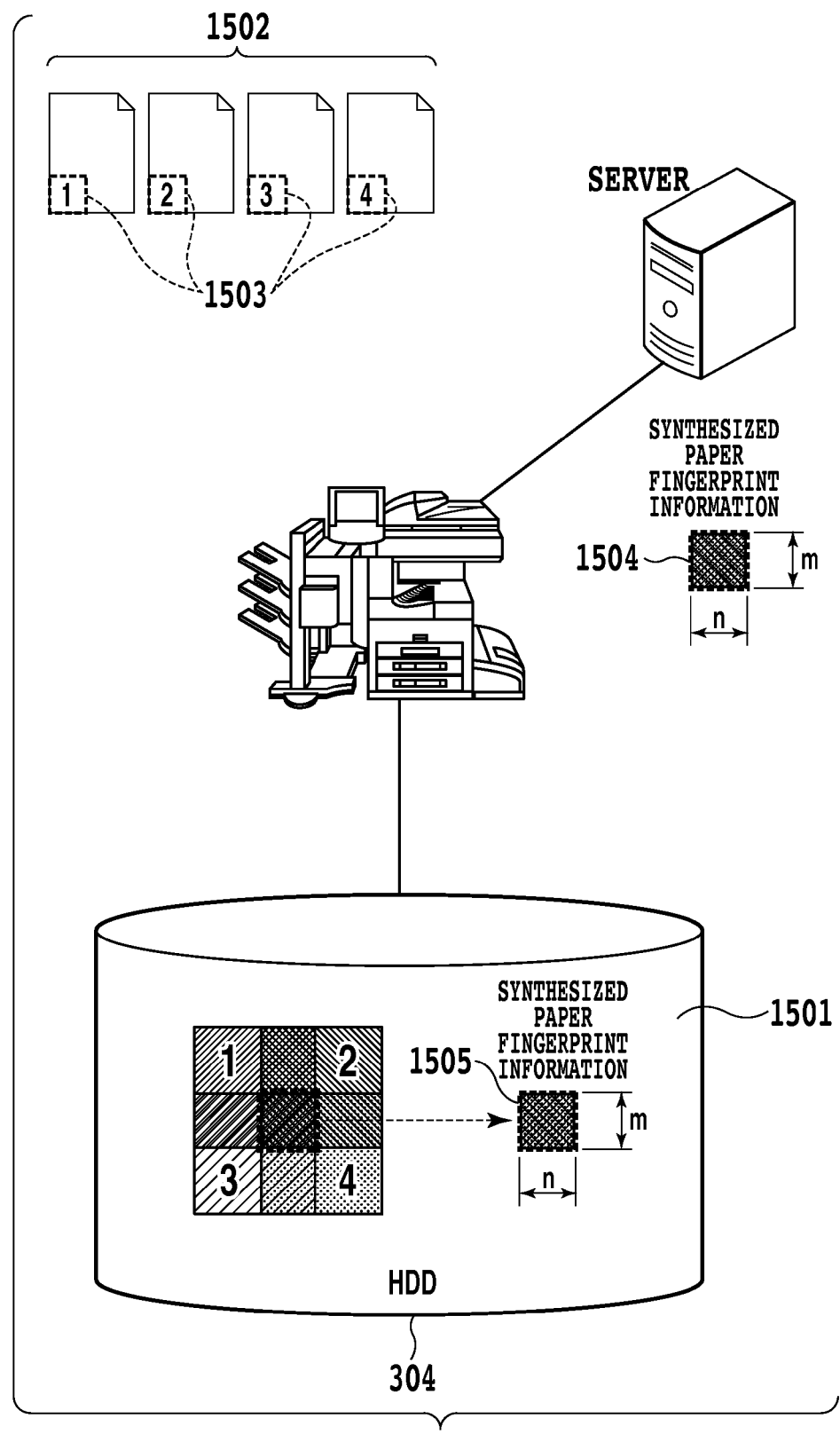
FIG. 15 is a conceptual view of paper fingerprint information collation processing in the second embodiment of the present invention.

A conceptual view of this processing is shown in FIG. 15.

In FIG. 15, the reference numeral 1502 expresses a paper document as a collating object consisting of four pages, and an extraction area group in which paper fingerprint information is read out from each page is expressed by the reference numeral 1503.

Figure 14:
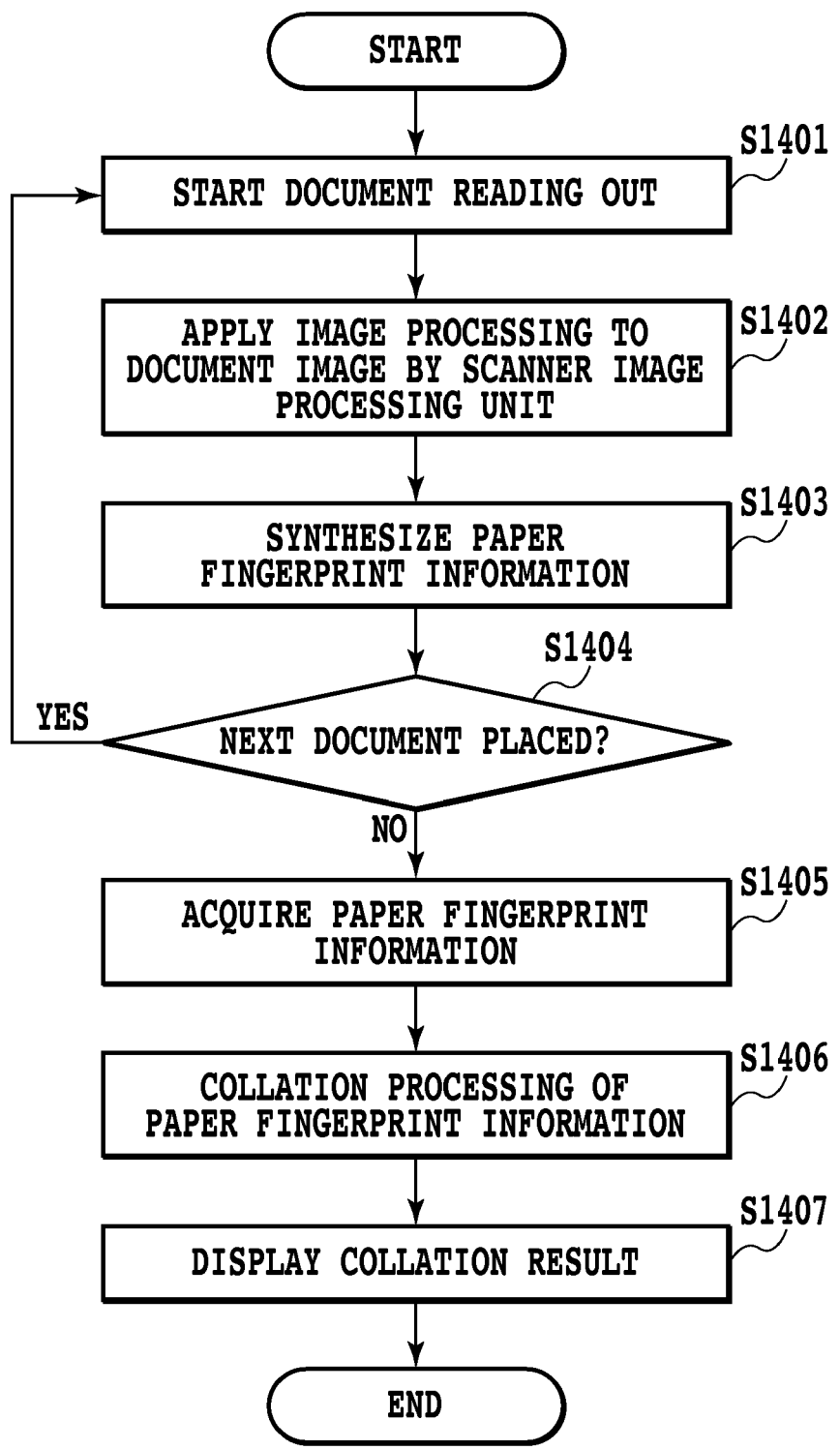
FIG. 14 is a view describing operations of paper fingerprint information collation processing in the second embodiment of the present invention.

The reference numeral 1501 expresses the HDD 304, and expresses a state where, in Step S1403 of FIG. 14, grayscale data 1505 in the collating paper fingerprint information is stored on the HDD 304 of the image forming apparatus by using the paper fingerprint information management unit 340.

n and m shown in FIG. 15 indicate a collation region (n pixels laterally and m pixels longitudinally).

The reference numeral 1504 expresses collated paper fingerprint information registered in the server, and this collated paper fingerprint information 1504 is acquired and collated with the collating paper fingerprint information stored on the HDD 304. This collation processing is as described in <Paper fingerprint information collation processing> with reference to FIG. 9.

In this embodiment described above, in comparison with the first embodiment, the originality as a whole of a paper document consisting of a plurality of pages can be guaranteed without considering the page order.

Third Embodiment

In the aforementioned second embodiment, as the collated paper fingerprint information registered in the server, paper fingerprint information obtained by synthesizing grayscale data in paper fingerprint information of the pages is used as shown in FIG. 13.

In this case, if the number of pages of the collating object increases, the information unique to the paper fingerprint information of the respective pages are negated and may cause erroneous determination.

Therefore, in the third embodiment, paper fingerprint information obtained by synthesizing paper fingerprint information of a target page and paper fingerprint information of a page readout immediately after the target page is used as paper fingerprint information of a collated object.

Accordingly, even in a case of a paper document of a large number of pages, the originality as a whole of the paper document consisting of the plurality of pages can be guaranteed by utilizing the relationship between the pages without losing information unique to the paper fingerprint information of the respective pages.

Hereinafter, the third embodiment of the present invention will be described with reference to the drawings.

<Operations when the Paper Fingerprint Information Registration Tab 720 is Depressed (FIG. 10)>

Figure 10:
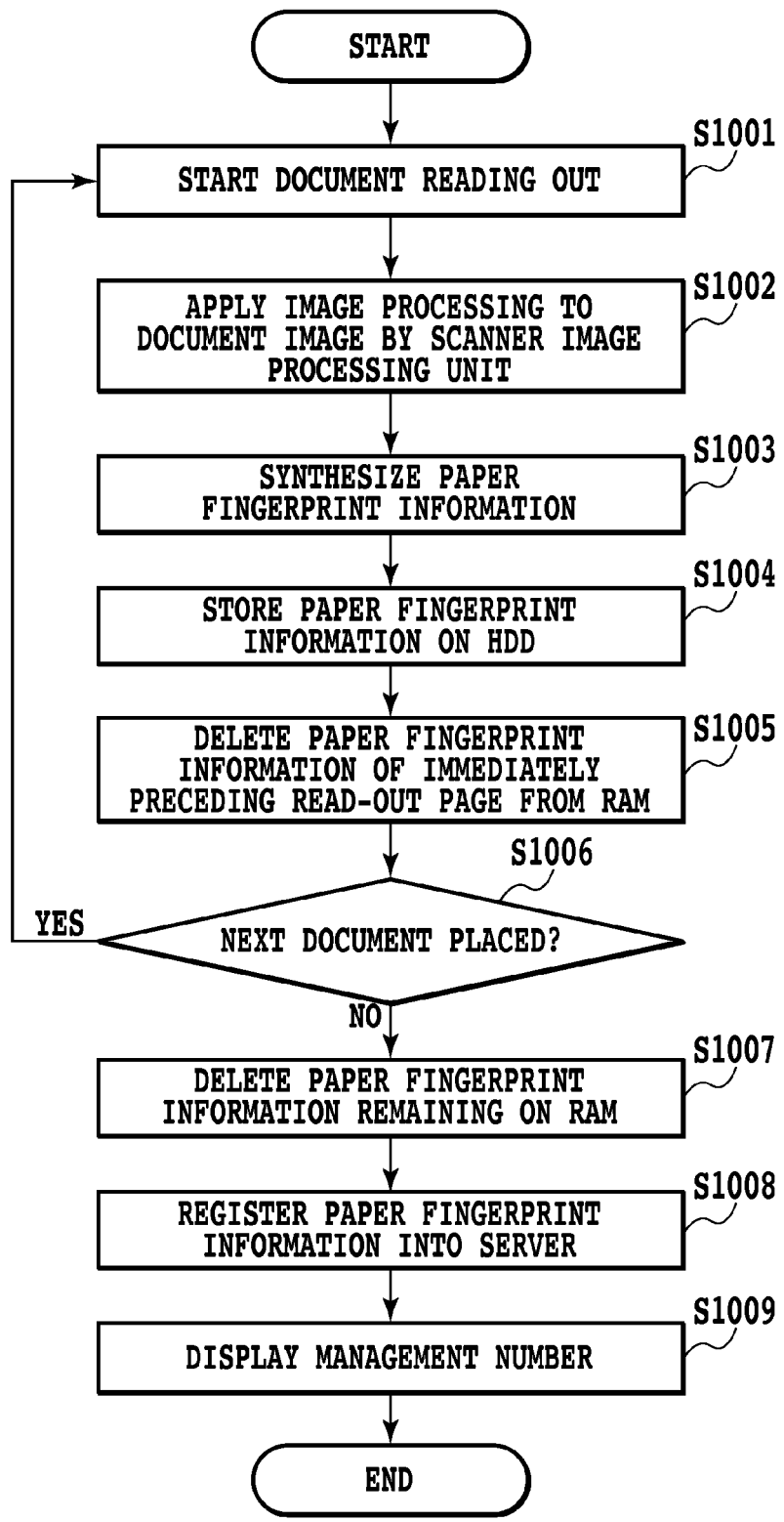
FIG. 10 is a view describing operations when depressing a paper fingerprint information registration tab in a third embodiment of the present invention.

In the third embodiment, paper fingerprint information registration processing to be executed when the paper fingerprint information registration tab 720 shown in FIG. 7 is depressed (and then the start key is depressed) by a user will be described with reference to FIG. 10.

In Step S1001, the CPU 301 performs control so as to transmit a document read out by the scanner unit 13 to the scanner image processing unit 312 via the scanner I/F 311 as image data.

In Step S1002, the scanner image processing unit 312 sets a gain adjustment value smaller than a general gain adjustment value into the shading correction unit 500. Then, it outputs luminance signal values obtained by applying the smaller gain adjustment value to the image data to the paper fingerprint information acquisition unit 507. Thereafter, based on the output data, the paper fingerprint information acquisition unit 507 acquires paper fingerprint information. Then, it transmits the acquired paper fingerprint information to the RAM 302 by using a data bus not shown.

In the paper fingerprint acquisition technique, as long as a fiber pattern is acquired from a white region, it is essential to obtain dark image data. Therefore, in the present embodiment, by setting a gain adjustment value smaller than a general gain adjustment value by the scanner image processing unit 312, dark image data for paper fingerprint information acquisition was obtained. However, the method for obtaining the dark image data is not limited to this. For example, a method for scanning by reducing the light amount is also possible.

In Step S1003, when an immediately preceding the read-out page stored in the RAM 302 has a plurality of paper fingerprint information, the CPU 301 generates one piece of paper fingerprint information by synthesizing two pieces of paper fingerprint information by the synthetic unit 327, and manages it by the paper fingerprint information management unit 340. At this time, grayscale data in the paper fingerprint information becomes data of n pixels laterally and m pixels longitudinally (a conceptual view of this is described in FIG. 11).

In Step S1004, the CPU 3001 stores the paper fingerprint information created in Step S1003 on the HDD 304 of the image forming apparatus by the paper fingerprint information management unit 340.

Figure 16:
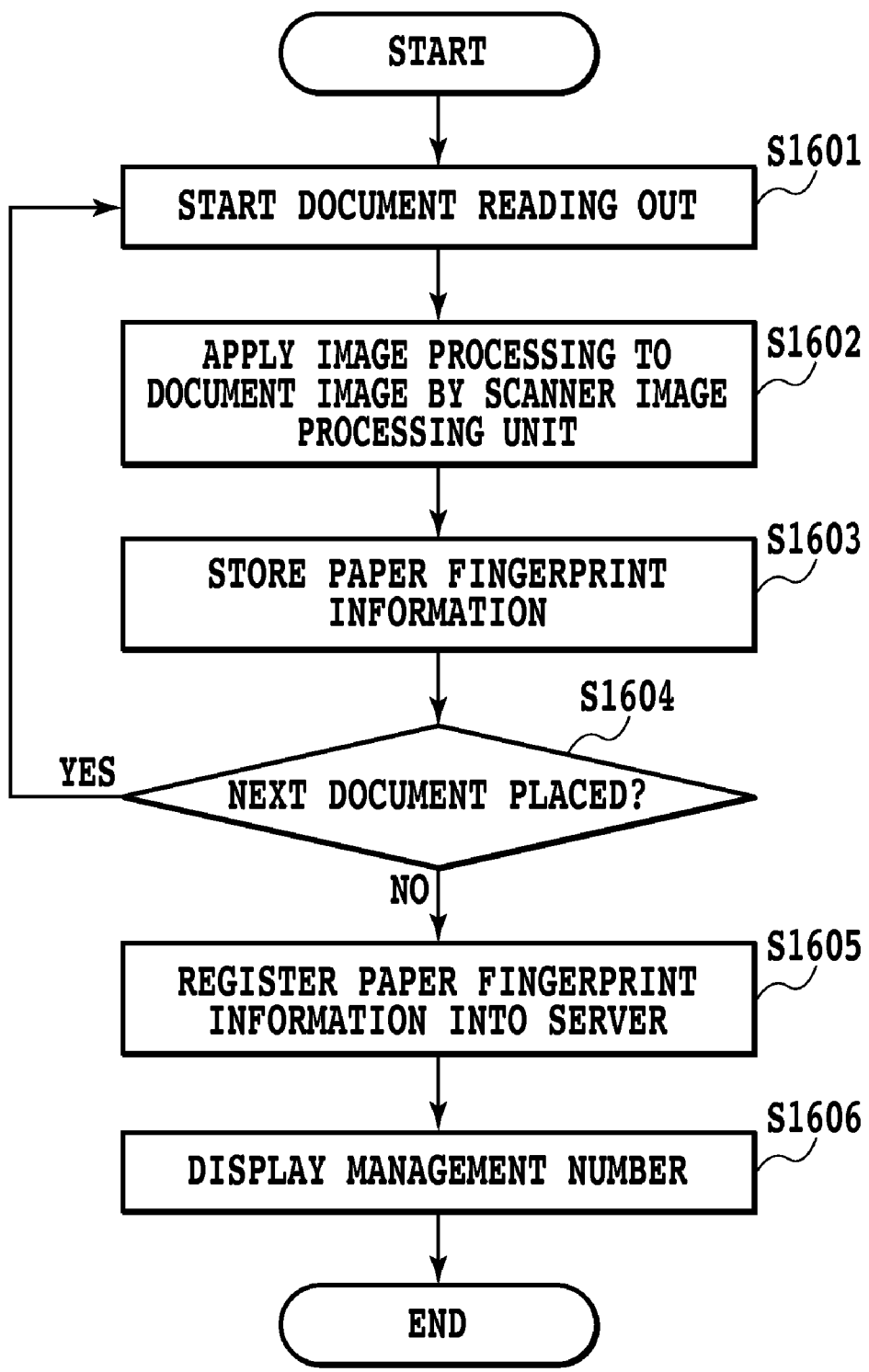
FIG. 16 is a view describing operations when depressing a paper fingerprint information registration tab 720 in a first embodiment of the present invention.

As the synthesis processing of the paper fingerprint information of Step S1003 and storing on the HDD 304 of Step S1004, in the same manner as in Step S1603 of FIG. 16, grayscale data in the paper fingerprint information is stored on the HDD 304 as tile data in a region of n pixels laterally and m pixels longitudinally. At this time, a method in which paper fingerprint information is stored in a storage region following registered paper fingerprint information as if tiles are arranged in order may be adopted (A conceptual view of this tile image data is described in FIG. 17 described above).

As long as the same method for creating paper fingerprint information is adopted for the paper fingerprint information to be registered and paper fingerprint information to be referred to, any method can be adopted, however, as the present embodiment, a method for creating paper fingerprint information by using the synthetic unit 327 is adopted and described as follows.

In Step S1005, when paper fingerprint information of an immediately preceding read-out page is in the RAM 302, the CPU 301 deletes this paper fingerprint information.

In Step S1006, the CPU 301 determines whether a subsequent document is placed on the scanner unit 13. In Step S1006, when the CPU 301 determines that a subsequent document is placed on the scanner unit 13, the process advances to Step S1001. In Step S1006, when the CPU 301 determines that no subsequent document is placed on the scanner unit 13, the process advances to Step S1007.

In Step S1007, when paper fingerprint information is in the RAM 302, the CPU 301 deletes this paper fingerprint information.

In Step S1008, the CPU 301 receives a management number issued from the server, and then registers this management number and paper fingerprint information stored on the HDD 304 of the image forming apparatus acquired from the paper fingerprint information management unit 340 into the server by associating these with each other. In other words, a plurality of paper fingerprint information are registered with one management number.

In Step S1009, the CPU 301 performs control so as to display the management number on the display screen. It is also possible that the CPU performs control so as to print this management number by the image forming apparatus 10.

Next, creation of the paper fingerprint information shown in FIG. 10 will be described with reference to the conceptual view of FIG. 11. The reference numeral 1101 expresses a paper document as a paper fingerprint registering object consisting of four pages, and an extraction area group in which paper fingerprint information is read out from each page is expressed by the reference numeral 1102.

The reference numeral 1103 expresses paper fingerprint information extracted from the extraction area group 1102, and illustrates paper fingerprint information of the first through fourth pages. L and K in the figure express a paper fingerprint region (L pixels laterally and K pixels longitudinally) of one page.

The reference numeral 1104 expresses generation of one piece of paper fingerprint information 1105 by synthesizing first page and second page paper fingerprint information by the synthetic unit 327.

The reference numeral 1106 expresses generation of one piece of paper fingerprint information 1107 by synthesizing second page and third page paper fingerprint information by the synthetic unit 327.

Similarly, the reference numeral 1108 expresses generation of one piece of paper fingerprint information 1109 by synthesizing the third page and fourth page paper fingerprint information by the synthetic unit 327.

n and m in the figure express a collation region (n pixels laterally and m pixels longitudinally).

Figure 11:
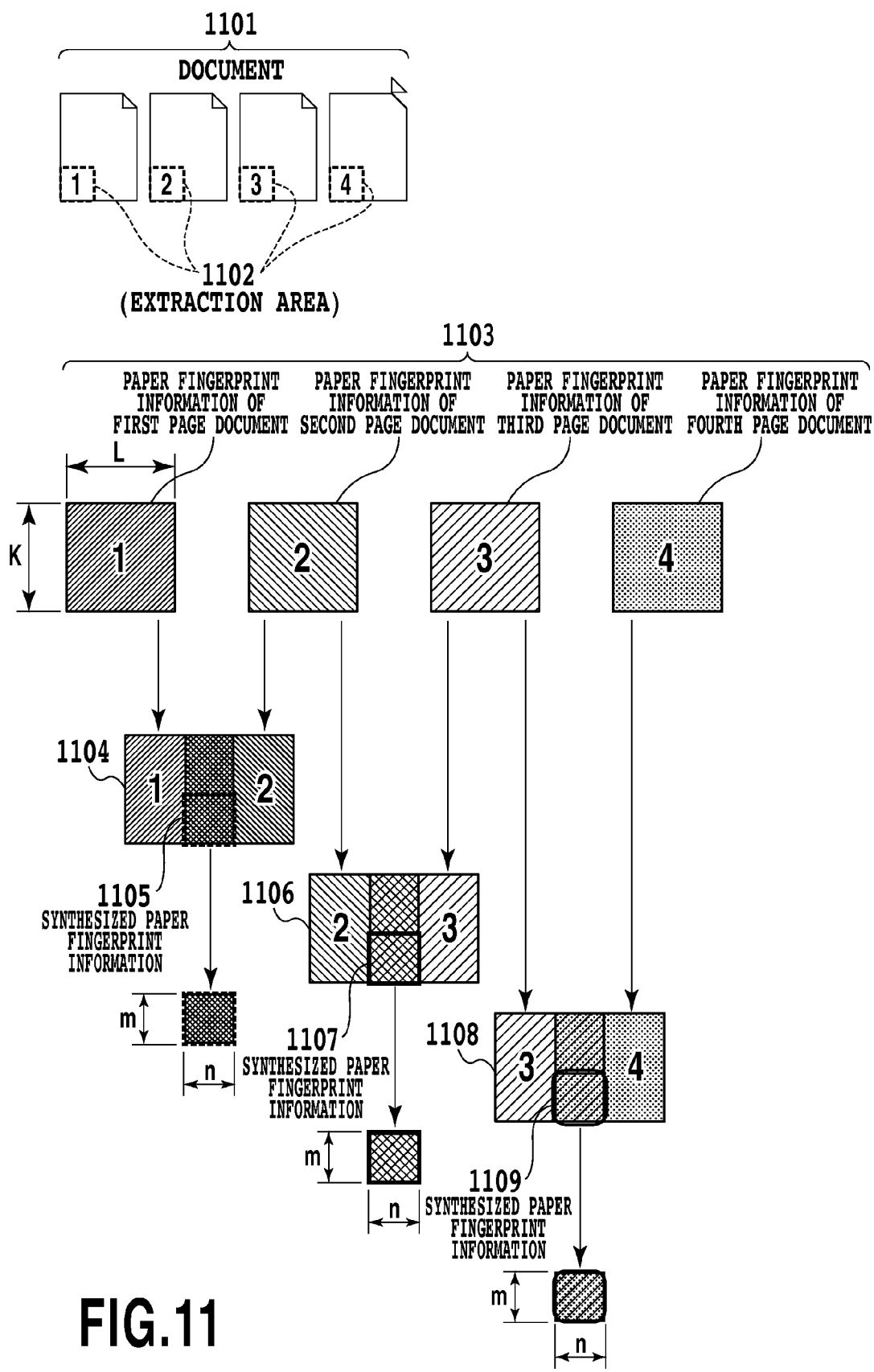
FIG. 11 is a conceptual view of processing when creating paper fingerprint information in the third embodiment of the present invention.

In FIG. 11, the paper fingerprint information 1105, 1107, and 1109 created from the paper fingerprint information group 1103 are expressed smaller in size than the paper fingerprint information group 1103 (that is, L>n, K>m). However, this is an expression for the sake of expressing the synthesis processing, and they may have sizes equivalent to that of the paper fingerprint information group 1103 (L=n, K=m).

<Operations when the Paper Fingerprint Information Collation Processing Tab is Depressed (FIG. 20)>

Subsequently, operations when the paper fingerprint information collation tab 721 shown in FIG. 7 is depressed by a user, and then the start key is depressed after a management number is input, will be described with reference to FIG. 20.

In Step S1901, the CPU 301 performs control so as to transmit a document read out by the scanner unit 13 to the scanner image processing unit 312 via the scanner I/F 311 as image data.

In Step S1902, the scanner image processing unit 312 applies the processing of FIG. 5 to this image data to generate new image data and attribute data. The scanner image processing unit makes this attribute data accompany the image data.

Further, in this step S1902, the CPU 301 acquires paper fingerprint information from the document read out in Step S1901 by the paper fingerprint information acquisition unit 507 inside the scanner image processing unit 312. Then, the CPU transmits the acquired paper fingerprint information to the RAM 302 by using a data bus not shown.

In Step S1903, when an immediately preceding read-out page stored in the RAM 302 has a plurality of paper fingerprint information, the CPU 301 generates one piece of paper fingerprint information by synthesizing two pieces of paper fingerprint information by the synthetic unit 327 and manages it by the paper fingerprint information management unit 340.

In Step S1904, the CPU 301 stores the paper fingerprint information created in Step S1903 on the HDD 304 of the image forming apparatus by the paper fingerprint information management unit 340.

In Step S1905, the CPU 301 acquires paper fingerprint information registered in the server while associated with the input management number. Then, the CPU transmits the acquired information to the RAM 302 by using a data bus not shown. A plurality of paper fingerprint information are registered in the server while associated with one management number, so that in Step S1905, the CPU 301 acquires all paper fingerprint information (collated paper fingerprint information) registered with the input management number.

In Step S1906, the CPU 301 collates the paper fingerprint information registered in the server and the paper fingerprint information acquired through the paper fingerprint information acquisition unit 507. This collation processing is as described in <Paper fingerprint information collation processing> with reference to FIG. 9.

In Step S1907, when the CPU 301 determines "match" in the collation processing of Step S1906, the process advances to Step S1908, and when it determines "mismatch," the process advances to Step S1912.

In Steps S1906 and S1907, the CPU 301 compares one piece of collating paper fingerprint information synthesized in Step S1903 with a plurality of collated paper fingerprint information acquired in Step S1905. Herein, a method in which the collation processing is applied to all collated paper fingerprint information until hitting "match" may be used. A method may also be used in which collation orders are assigned to a plurality of collated paper fingerprint information when registering the paper fingerprint information, and in the order of the collation orders, the collated paper fingerprint information are compared and determined as "match" and "mismatch" are determined for these.

In Step S1908, when paper fingerprint information of an immediately preceding read-out page is in the RAM 302, the CPU 301 deletes this paper fingerprint information.

In Step S1909, the CPU 301 deletes collated paper fingerprint information which was determined as "match" in the collation processing of Step S1906 from the RAM 302.

In Step S1910, the CPU 301 determines whether a subsequent document is placed on the scanner unit 13. In Step S1910, when the CPU 301 determines that a subsequent document is placed on the scanner unit 13, the process advances to Step S1901. In Step S1910, when the CPU 301 determines that no subsequent document is placed on the scanner unit 13, the process advances to Step S1910.

In Step S1911, when collated paper fingerprint information is in the RAM 302, the CPU 301 recognizes that the number of pages of a collating object and the number of pages of an collated object do not match with each other, and determines "mismatch" in the collation processing (information determined as "match" is deleted in Step S1909, so that the remainder is "mismatch" information). Even when an act such as page stealing is committed, a correct collation result can be obtained by Step S1911.

In Step S1912, the CPU 301 performs control so as to display the result (match/mismatch) obtained through <Paper fingerprint information collation processing> and Step S1911 on the display screen of the operation unit.

Figure 21:
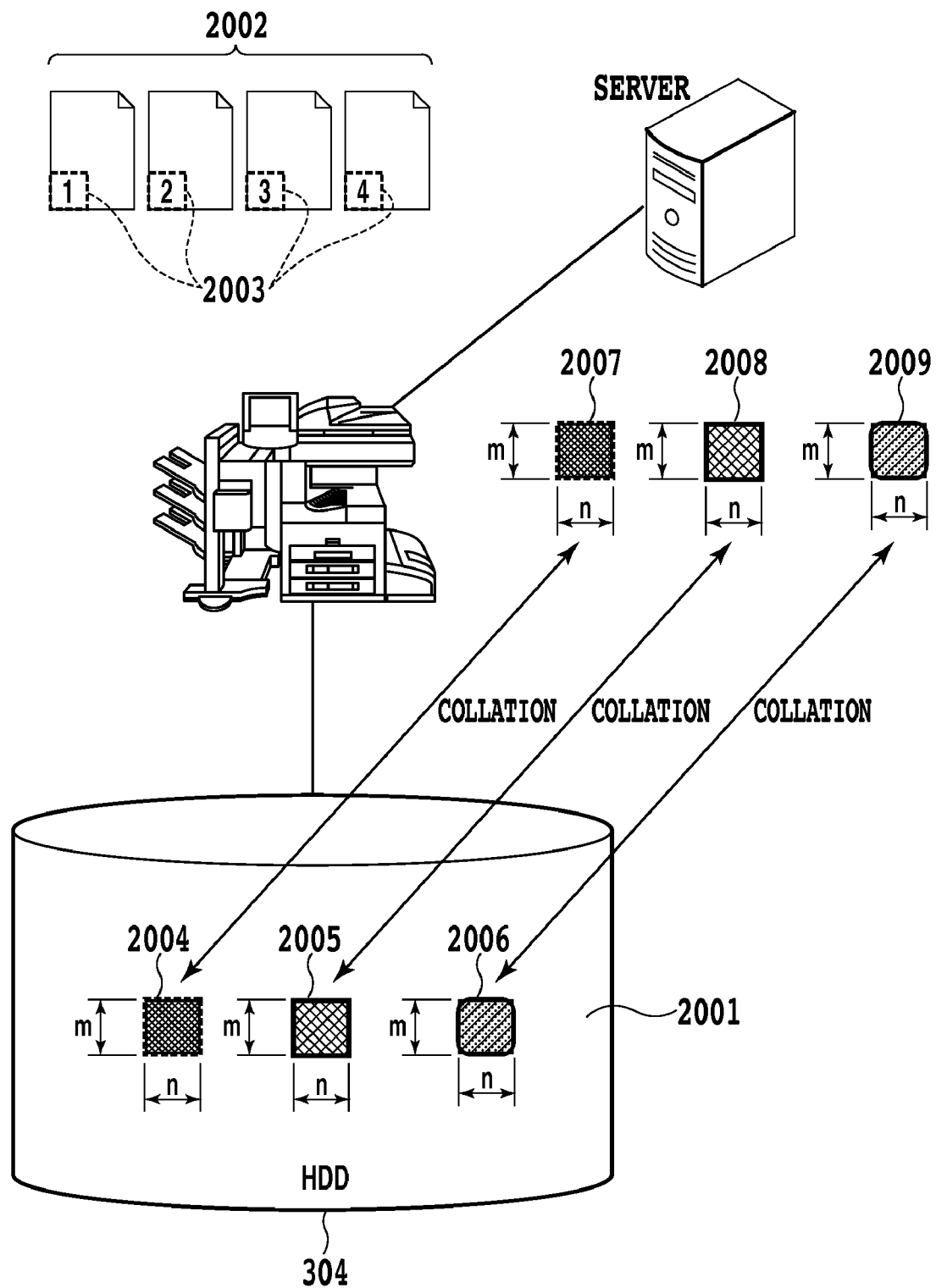
FIG. 21 is a conceptual view of paper fingerprint information collation processing in the third embodiment of the present invention.

A conceptual view of this processing is shown in FIG. 21.

In FIG. 21, the reference numeral 2002 expresses a paper document as a collating object consisting of four pages, and an extraction area group in which paper fingerprint information is read out from each page is expressed by the reference numeral 2003.

Figure 20:
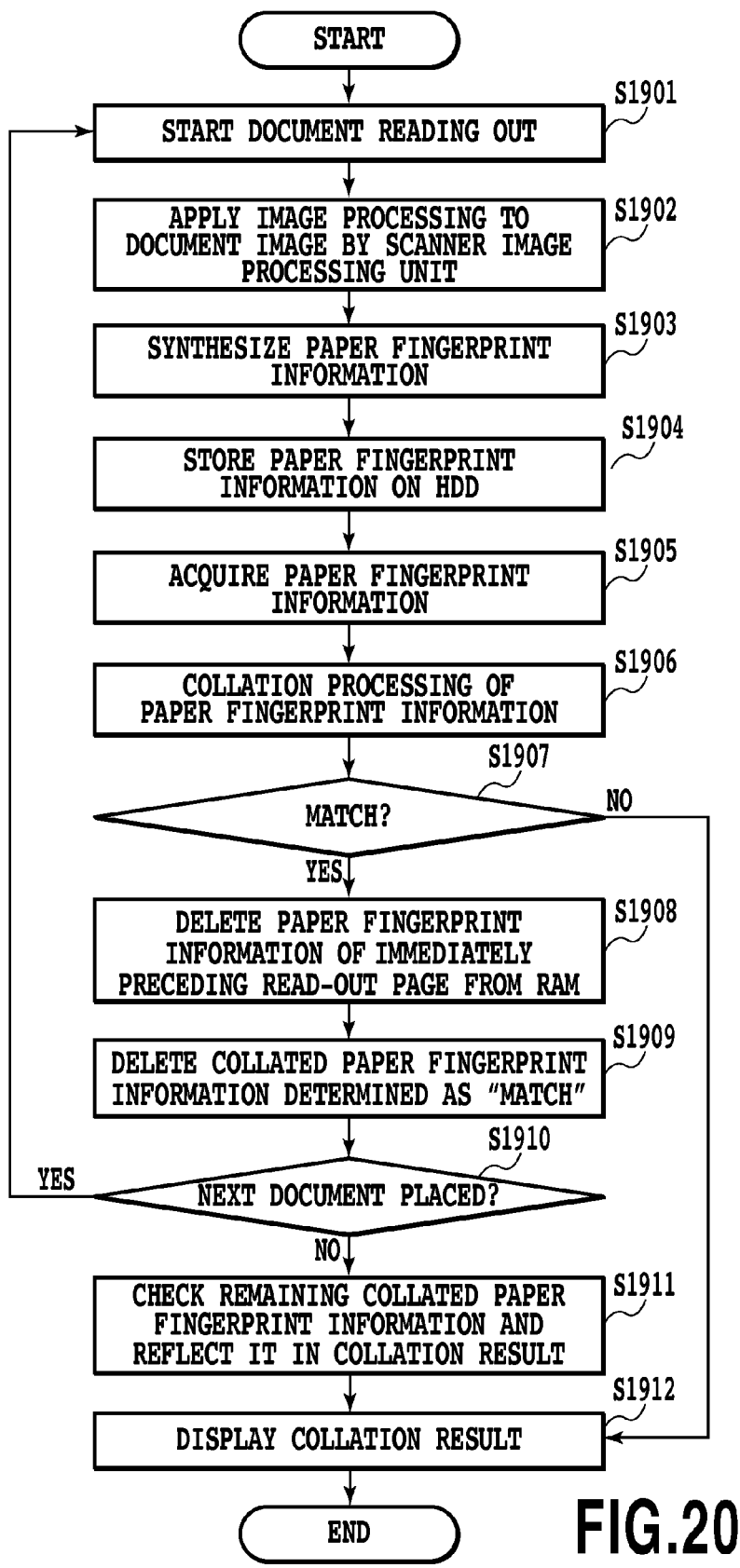
FIG. 20 is a view describing operations of paper fingerprint information collation processing in the third embodiment of the present invention.

The reference numeral 2001 expresses the HDD 304, and expresses a state where (grayscale data in) collating paper fingerprint information is stored on the HDD 304 of the image forming apparatus in Step S1904 of FIG. 20. n and m in the figure indicate a collation region (n pixels laterally and m pixels longitudinally).

The reference numeral 2004 expresses paper fingerprint information created by synthesizing the first page and second page paper fingerprint information by the synthetic unit 327.

The reference numeral 2005 expresses paper fingerprint information created by synthesizing the second page and third page paper fingerprint information by the synthetic unit 327.

Similarly, the reference numeral 2006 expresses paper fingerprint information created by synthesizing the third page and fourth page paper fingerprint information by the synthetic unit 327.

The reference numerals 2007, 2008, and 2009 express paper fingerprint information to be registered in the server while associated with a specific management number, and these paper fingerprint information are acquired and collated with collating paper fingerprint information stored on the HDD 304. This collation processing is as described in <Paper fingerprint information collation processing> with reference to FIG. 9.

As described above, according to this embodiment, in comparison with the second embodiment, even in the case of guaranteeing the originality of a paper document containing a large number of pages, collation can be performed without erroneous determination. Further, according to this embodiment, collation is not necessary after reading out all pages, and at a time when a "mismatch" page is determined, the collation result can be displayed, so that the time for collation can be relatively reduced.

However, the necessary number of paper fingerprint information to be registered on the server is "all pages minus 1," so that the storage region use efficiency on the server is lower than that in the first embodiment and second embodiment.

Other Embodiments

Further, the present invention is also applicable to a system including a plurality of devices (for example, a computer, an interface device, a reader, and a printer, etc.) and an apparatus (a copying machine, printer, or facsimile machine) consisting of one device.

An object of the present invention can also be achieved by reading out a program realizing the steps of the flowcharts shown in the above-described embodiments from a storage medium storing this program and executing the program by a computer (or CPU or MPU) of the system or apparatus. In this case, the program itself read out from the storage medium realizes the functions of the above-described embodiments. Therefore, this program and the storage medium storing the program are also one of the present invention.

As the storage medium for supplying the program, for example, a floppy (registered trademark) disk, hard disk, optical disk, magnet optical disk, CD-ROM, CD-R, magnetic tape, nonvolatile memory card, ROM, or the like can be used.

By executing the program read out by the computer, the functions of the above-described embodiments are realized. In addition, the case where the OS (operating system), etc., operating on the computer based on an instruction of the program performs a part or whole of actual processing and this processing realizes the functions of the above-described embodiments is also included.

Further, it is also possible that the program read out from the storage medium is written on an extension board inserted in the computer or a memory installed in an extension unit connected to the computer. Thereafter, based on an instruction of the program, a CPU of the extension board or extension unit performs a part or whole of actual processing and this processing realizes the functions of the above-described embodiments.

The plurality of paper media may be called "first paper medium" and "second paper medium." The paper medium may consist of N (N=natural number) pages. The plurality of fiber information may be called "first fiber information" and "second fiber information." The plurality of storage unit may be called "first storage unit" and "second storage unit."

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-275476, filed Oct. 23, 2007, which is hereby incorporated by reference herein in its entirety.

What is claimed is:

1. An image forming apparatus comprising:
   an extracting unit that extracts fiber information from paper media;
   a first storage unit that synthesizes and stores, as first fiber information, fiber information extracted from pages of a first paper medium consisting of a plurality of pages using the extracting unit;
   a second storage unit that synthesizes and stores, as second fiber information, fiber information extracted from pages of a second paper medium consisting of a plurality of pages using the extracting unit; and
   a comparing unit that compares the first fiber information and the second fiber information and determines whether they match each other,
   wherein if f1 (x,y) represents grayscale image data in the first fiber information and α1(x,y) represents mask data in the first fiber information, and
   f2 (x,y) represents grayscale image data in the second fiber information and α2(x,y) represents mask data in the second fiber information, then,
   the match determined using a collation error E(i,j) is indicated as $$E(i, j) = \frac{\sum_{x,y} \alpha_1(x, y)\alpha_2(x - i, y - j)\{f_1(x, y) - f_2(x, y)\}^2}{\sum_{x,y} \alpha_1(x, y)\alpha_2(x - i, y - j)}. \quad (1)$$

2. The image forming apparatus according to claim 1, wherein the result of the comparing unit is displayed on a display screen.

3. An image forming apparatus comprising:
   an extracting unit that extracts fiber information from a paper media;
   a first storage unit that synthesizes fiber information extracted using the extracting unit from a page of a first paper medium among a plurality of pages and fiber information extracted from a page different from the page of the first paper medium among the plurality of pages and stores the synthesized information as first fiber information;
   a second storage unit that synthesizes fiber information extracted using the extracting unit from a page of a second paper medium among a plurality of pages and fiber information extracted from a page different from the page of the second paper medium among the plurality of pages and stores the synthesized information as second fiber information; and
   a comparing unit that compares the first fiber information and the second fiber information and determines whether they match each other, wherein if f1 (x,y) represents grayscale image data in the first fiber information and α1(x,y) represents mask data in the first fiber information, and f2(x,y) represents grayscale image data in the second fiber information and α2(x,y) represents mask data in the second fiber information, then, the match determined using a collation error E(i,j) is indicated as $$E(i, j) = \frac{\sum_{x,y} \alpha_1(x, y)\alpha_2(x - i, y - j)\{f_1(x, y) - f_2(x, y)\}^2}{\sum_{x,y} \alpha_1(x, y)\alpha_2(x - i, y - j)}. \quad (1)$$

4. The image forming apparatus according to claim 3, wherein the first paper medium consists of N (N =natural number) pages, and the first storage unit synthesizes fiber information of the first paper medium and stores it.

5. The image forming apparatus according to claim 3, wherein the second paper medium consists of N (N =natural number) pages, and the second storage unit synthesizes fiber information of the second paper medium and stores it.

6. A method for controlling an image forming apparatus comprising:
   an extraction step of extracting fiber information from paper media;
   a first storage step of storing fiber information extracted using the extraction step from a page of a first paper medium among a plurality of pages and fiber information extracted from a page different from the page of the first paper medium among the plurality of pages as first fiber information by synthesizing them;
   a second storage step of storing fiber information extracted using the extraction step from a page of a second paper medium among a plurality of pages and fiber information extracted from a page different from the page of the second paper medium among the plurality of pages as second fiber information by synthesizing them;
   a comparison step of comparing the first fiber information and the second fiber information to determine whether they match each other; and
   a control step of controlling the image forming apparatus based on a comparison result in the comparison step,
   wherein if f1(x,y) represents grayscale image data in the first fiber information and α1(x,y) represents mask data in the first fiber information, and
   f2(x,y) represents grayscale image data in the second fiber information and α(x,y) represents mask data in the second fiber information, then,
   the match determined using a collation error E(i,j) is indicated as $$E(i, j) = \frac{\sum_{x,y} \alpha_1(x, y)\alpha_2(x - i, y - j)\{f_1(x, y) - f_2(x, y)\}^2}{\sum_{x,y} \alpha_1(x, y)\alpha_2(x - i, y - j)}. \quad (1)$$

7. A program, embodied in a non-transitory computer-readable medium, for making a computer execute the method for controlling an image forming apparatus according to claim 6.

8. A non-transitory computer-readable storage medium which stores a program that, when executed by a processor in an image forming apparatus, controls the image forming apparatus to perform the steps recited in claim 6.

* * * * *